(12) United States Patent
Wilson

(10) Patent No.: US 12,184,219 B2
(45) Date of Patent: Dec. 31, 2024

(54) HYDRO-ELECTROLYSIS THERMAL ELECTRICITY GENERATION SYSTEM AND METHOD

(71) Applicant: Charles Robert Wilson, Miami, FL (US)

(72) Inventor: Charles Robert Wilson, Miami, FL (US)

( * ) Notice: Subject to any disclaimer, the term of this patent is extended or adjusted under 35 U.S.C. 154(b) by 0 days.

(21) Appl. No.: 18/628,667

(22) Filed: Apr. 5, 2024

(65) Prior Publication Data

US 2024/0339951 A1 Oct. 10, 2024

Related U.S. Application Data

(60) Provisional application No. 63/568,200, filed on Mar. 21, 2024, provisional application No. 63/457,448, filed on Apr. 6, 2023.

(51) Int. Cl.
*H02S 10/10* (2014.01)
*C25B 1/04* (2021.01)
(Continued)

(52) U.S. Cl.
CPC ............... *H02S 10/10* (2014.12); *C25B 1/04* (2013.01); *F01D 15/10* (2013.01); *H02S 40/44* (2014.12); *Y02E 10/50* (2013.01)

(58) Field of Classification Search
CPC . H02S 10/10; H02S 40/44; C25B 1/04; F01D 15/10; Y02E 10/50
See application file for complete search history.

(56) References Cited

U.S. PATENT DOCUMENTS 3,070,703 A * 12/1962 Podolny ............... F03G 6/065
126/684
3,459,953 A * 8/1969 Brauser ............. F01K 25/005
60/659

(Continued)

FOREIGN PATENT DOCUMENTS

| DE | 2510226 C2 | 5/1976 |
|----|------------|--------|
| DE | 3413772 A1 | 10/1985 |
| ES | 2285911 B1 | 11/2007 |

*Primary Examiner* — Pedro J Cuevas
(74) *Attorney, Agent, or Firm* — HOLLOWELL PATENT GROUP; Kelly Hollowell

(57) ABSTRACT

Herein disclosed is receiving a request for an amount of electric energy, generating hydrogen by dissociating hydrogen from water, storing the dissociated hydrogen, determining if sufficient hydrogen has been stored to generate the requested amount of electric energy, refraining from recombining the hydrogen with oxygen until sufficient hydrogen has been stored and in response to determining sufficient hydrogen has been stored, activating hydrogen recombination with oxygen to generate the requested amount of electric energy. The hydrogen may be dissociated using an electrolyzer. The electrolyzer may be powered by a battery or a photovoltaic array. An implementation may selectively charge the battery or power the electrolyzer using the photovoltaic array. Steam pressurized from recombining the dissociated hydrogen with oxygen may be used to drive a turbine generator to produce the requested amount of electric energy. Condensed water from the steam may be recycled to the electrolyzer for reuse in hydrogen dissociation.

20 Claims, 9 Drawing Sheets

(51) Int. Cl.
*F01D 15/10* (2006.01)
*H02S 40/44* (2014.01)

(56) References Cited

U.S. PATENT DOCUMENTS

| | | | | |
|---|---|---|---|---|
| 4,021,323 | A * | 5/1977 | Kilby | H01G 24/24 |
| | | | | 204/266 |
| 4,161,657 | A * | 7/1979 | Shaffer, Jr. | F03G 6/068 |
| | | | | 290/1 R |
| 4,246,080 | A | 1/1981 | Shinn | |
| 4,341,607 | A * | 7/1982 | Tison | G05F 1/67 |
| | | | | 204/229.4 |
| 4,354,117 | A * | 10/1982 | Abernathy | F03G 6/065 |
| | | | | 60/641.15 |
| 4,841,731 | A * | 6/1989 | Tindell | F01K 25/005 |
| | | | | 60/39.12 |
| 4,910,963 | A * | 3/1990 | Vanzo | F01K 25/005 |
| | | | | 60/648 |
| 5,228,529 | A * | 7/1993 | Rosner | B60L 8/003 |
| | | | | 429/49 |
| 6,100,600 | A * | 8/2000 | Pflanz | B63B 35/44 |
| | | | | 299/9 |
| 6,211,643 | B1 * | 4/2001 | Kagatani | B60L 50/72 |
| | | | | 429/418 |
| 6,279,321 | B1 * | 8/2001 | Forney | F03G 6/001 |
| | | | | 60/641.11 |
| 6,610,193 | B2 * | 8/2003 | Schmitman | H01M 8/0656 |
| | | | | 204/266 |
| 6,864,596 | B2 | 3/2005 | Maiwald et al. | |
| 7,188,478 | B2 * | 3/2007 | Bourgeois | C25B 15/08 |
| | | | | 60/39.511 |
| 7,537,683 | B2 | 5/2009 | Prerad | |
| 8,169,101 | B2 * | 5/2012 | Hinders | F28F 3/046 |
| | | | | 60/641.2 |
| 8,256,219 | B2 * | 9/2012 | Hinders | F28F 19/02 |
| | | | | 60/660 |
| 8,281,590 | B2 * | 10/2012 | Hinders | F24T 10/20 |
| | | | | 290/55 |
| 9,163,607 | B2 * | 10/2015 | Tabe | F03D 9/25 |
| 12,018,596 | B2 * | 6/2024 | O'Donnell | F03G 6/071 |
| 2002/0090868 | A1 * | 7/2002 | Schmitman | H01M 8/186 |
| | | | | 440/113 |
| 2002/0100836 | A1 * | 8/2002 | Hunt | B63H 21/00 |
| | | | | 244/50 |
| 2002/0117125 | A1 | 8/2002 | McMaster et al. | |
| 2003/0006136 | A1 | 1/2003 | Hiki et al. | |
| 2008/0047502 | A1 * | 2/2008 | Morse | F03D 9/257 |
| | | | | 123/3 |
| 2008/0131830 | A1 * | 6/2008 | Nix | F24S 10/45 |
| | | | | 432/220 |
| 2009/0322090 | A1 * | 12/2009 | Wolf | F01K 23/00 |
| | | | | 60/39.12 |
| 2012/0125780 | A1 * | 5/2012 | Oakes | C25B 1/55 |
| | | | | 204/266 |
| 2013/0042626 | A1 * | 2/2013 | Johnston | H02J 3/381 |
| | | | | 60/39.12 |
| 2014/0298810 | A1 * | 10/2014 | Robinson | F22B 1/28 |
| | | | | 60/659 |
| 2017/0007018 | A1 | 3/2017 | Mayer | |
| 2017/0110883 | A1 * | 4/2017 | Tabe | F03B 13/26 |
| 2021/0061655 | A1 * | 3/2021 | El-Halwagi | B01J 19/24 |
| 2022/0008304 | A1 | 3/2022 | Cron et al. | |
| 2023/0002690 | A1 * | 1/2023 | Klaassen | C10G 69/04 |

* cited by examiner

HYDRO-ELECTROLYSIS THERMAL ELECTRICITY GENERATION SYSTEM AND METHOD

CROSS-REFERENCE TO RELATED APPLICATIONS

This application claims the benefit of U.S. Provisional Patent Application No. 63/457,448, titled "Hydro-Electrolysis Fueled Thermal Electricity Generator (HEF-TEG) Process," filed on Apr. 6, 2023; and this application also claims the benefit of U.S. Provisional Patent Application No. 63/568,200, titled "Hydro-Electrolysis Thermal Electricity Generation System and Method," filed on Mar. 21, 2024; and this application incorporates by reference herein the entire contents of all of the above-referenced applications.

TECHNICAL FIELD

This disclosure relates generally to hydrogen-fueled electricity generation.

BACKGROUND

The development and utilization of power generation systems have been a significant focus in various industries and sectors. These systems are designed to convert energy from one form to another, typically from mechanical or chemical energy to electrical energy. The generated electrical energy is then used to power various devices, equipment, and systems.

Power generation systems can be found in a wide range of applications, from large-scale power plants that supply electricity to entire cities or regions, to small-scale systems that power individual devices or appliances. The design and operation of these systems can vary greatly depending on the specific application, the type of energy source used, and the desired output.

In recent years, there has been a growing interest in the development of more efficient and sustainable power generation systems. This is driven by a number of factors, including the increasing demand for electricity, the need to reduce greenhouse gas emissions and other environmental impacts, and the desire to reduce dependence on fossil fuels and other non-renewable energy sources.

Various technologies and strategies have been proposed and implemented to improve the efficiency and sustainability of power generation systems. These include the use of renewable energy sources such as solar, wind, hydro, and geothermal power, the development of more efficient energy conversion processes, and the integration of energy storage systems to better manage the fluctuating nature of some renewable energy sources.

Despite these advancements, there are still many challenges and opportunities for further innovation in the field of power generation systems. These include the need for more cost-effective and reliable technologies, the development of systems that can seamlessly integrate with existing infrastructure, and the optimization of system design and operation to maximize energy output and minimize environmental impacts.

SUMMARY

Herein disclosed is receiving a request for an amount of electric energy, generating hydrogen by dissociating hydrogen from water, storing the dissociated hydrogen, determining if sufficient hydrogen has been stored to generate the requested amount of electric energy, refraining from recombining the hydrogen with oxygen until sufficient hydrogen has been stored and in response to determining sufficient hydrogen has been stored, activating hydrogen recombination with oxygen to generate the requested amount of electric energy. The hydrogen may be dissociated using an electrolyzer. The electrolyzer may be powered by a battery or a photovoltaic array. An implementation may selectively charge the battery or power the electrolyzer using the photovoltaic array. Steam pressurized from recombining the dissociated hydrogen with oxygen may be used to drive a turbine generator to produce the requested amount of electric energy. Condensed water from the steam may be recycled to the electrolyzer for reuse in hydrogen dissociation.

The details of various aspects are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
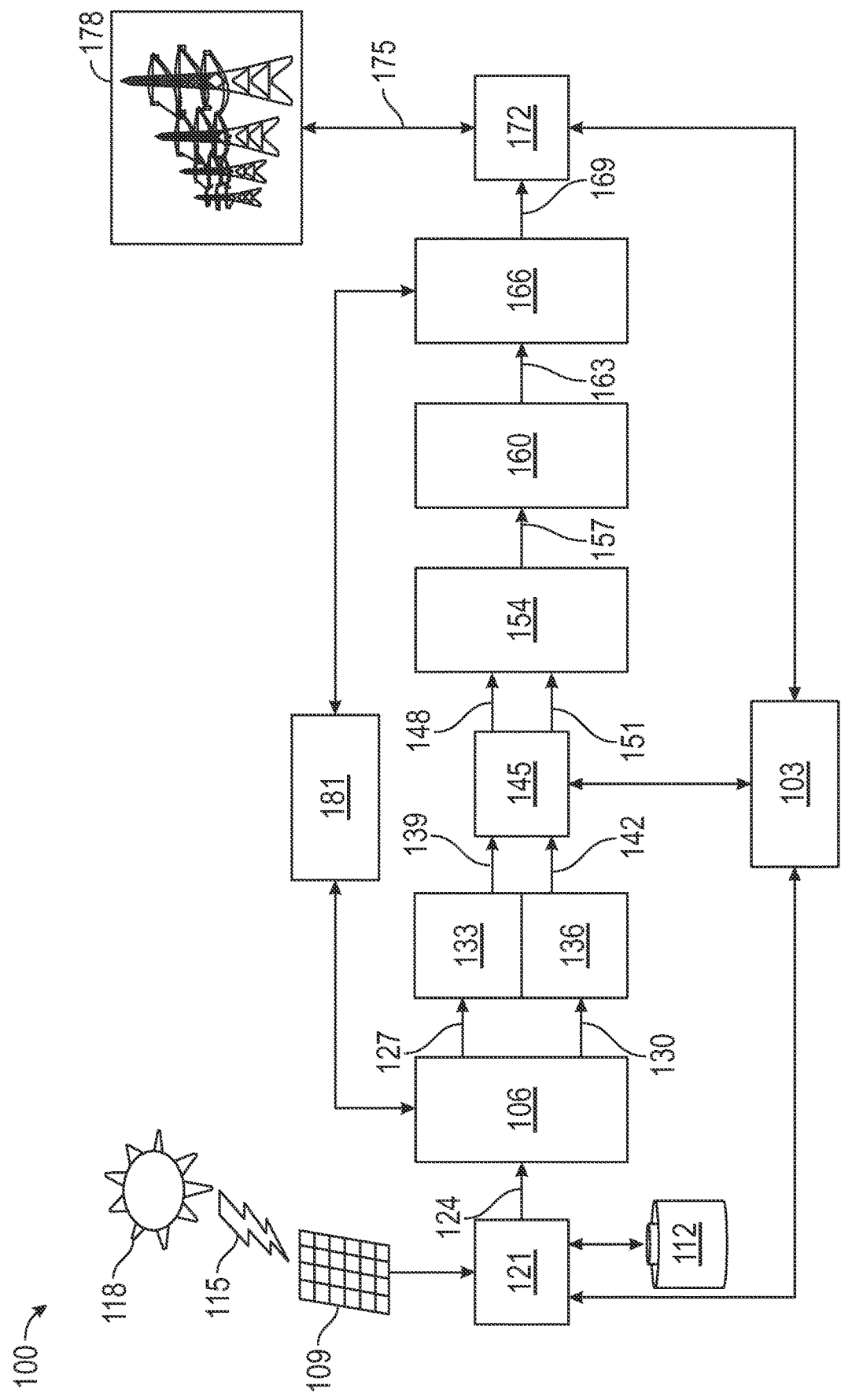
FIG. 1 depicts an illustrative operational scenario wherein an exemplary hydro-electrolysis thermal electricity generation (HEF-TEG) system is configured with a control system governing operations comprising receiving a request for an amount of electric energy, generating hydrogen by dissociating hydrogen from water, storing the dissociated hydrogen, determining if sufficient hydrogen has been stored to generate the requested amount of electric energy, refraining from combining the hydrogen with oxygen until sufficient hydrogen has been stored and in response to determining sufficient hydrogen has been stored, activating hydrogen recombination with oxygen to generate the requested amount of electric energy.

FIG. 1 depicts an illustrative operational scenario wherein an exemplary hydro-electrolysis thermal electricity generation (HEF-TEG) system is configured with a control system governing operations comprising receiving a request for an amount of electric energy, generating hydrogen by dissociating hydrogen from water, storing the dissociated hydrogen, determining if sufficient hydrogen has been stored to generate the requested amount of electric energy, refraining from combining the hydrogen with oxygen until sufficient hydrogen has been stored and in response to determining sufficient hydrogen has been stored, activating hydrogen recombination with oxygen to generate the requested amount of electric energy.

In FIG. 1, the exemplary electric power generation system 100 includes the control system 103. In the depicted implementation the control system 103 includes processing circuitry and a memory subsystem configured to cause the electric power generation system 100 to store energy as hydrogen dissociated from water and deliver the stored energy at a later time in response to demand. An exemplary implementation may time-shift energy availability, storing hydrogen dissociated from water when energy to power an electrolyzer is available. For example, hydrogen may be dissociated from water using energy from a rechargeable battery at nighttime, or from sunlight incident to photovoltaic cells during daytime. The electric power generation system 100 may refrain from combining hydrogen with oxygen until a sufficient amount of dissociated hydrogen is stored. The electric power generation system 100 may refrain from combining hydrogen with oxygen until a sufficient flow rate of dissociated hydrogen is available from an electrolyzer. The electric power generation system 100 may activate the combining of hydrogen with oxygen to generate the requested amount of electric energy when the sufficient amount of dissociated hydrogen is stored or the sufficient flow rate of dissociated hydrogen is available from an electrolyzer. The electric power generation system 100 may deliver the requested amount of electric energy in response to demand at a time later than the time when the hydrogen was generated and/or stored.

The exemplary electric power generation system 100 depicted in FIG. 1 includes the electrolysis chamber 106 configured to dissociate hydrogen and oxygen from water. The electrolysis chamber 106 may be referred to as an electrolysis pool. In the depicted implementation, the electrolysis chamber 106 may be powered by the photovoltaic array 109 or the power bank 112. The photovoltaic array 109 may receive energy as light 115 from the light source 118. In the depicted implementation the light 115 is sunlight. In the depicted implementation the light source 118 is the sun. In the depicted implementation the power bank 112 is a rechargeable battery. In the depicted implementation the electric current input control interface 121 is configured to selectively connect the electrolysis chamber electric current input 124 of the electrolysis chamber 106 to the power bank 112 or the photovoltaic array 109, depending on the electric charge level of the rechargeable battery and the electric current output from the photovoltaic array 109. The electric current input control interface 121 may be configured to measure the current output from the photovoltaic array 109 and determine if the current output is sufficient to perform electrolysis for generating hydrogen. For example, the electric current input control interface 121 may electrically connect the photovoltaic array 109 output to the electrolysis chamber electric current input 124 during daytime periods of sunlight from light source 118, depending on adequate current output from the photovoltaic array 109. The electric current input control interface 121 may electrically connect the power bank 112 output to the electrolysis chamber electric current input 124 during nighttime periods, depending on inadequate current output from the photovoltaic array 109. The electric current input control interface 121 may connect the power bank 112 to the photovoltaic array 109, to charge the rechargeable battery when sufficient current is not available for electrolysis from the power bank 112 or the photovoltaic array 109 and the power bank 112 is not charged.

In the implementation depicted by FIG. 1, the electrolysis chamber 106 dissociates hydrogen and oxygen from water. The exemplary electrolysis chamber 106 may emit dissociated hydrogen through the dissociated hydrogen outlet 127. The exemplary electrolysis chamber 106 may be configured to emit a mixture of dissociated hydrogen and dissociated oxygen through a single outlet to a single storage tank. In some implementations hydrogen and oxygen may not be stored. For example, control system 103 may be configured to use a flow rate sensor to determine if a sufficient flow rate of hydrogen is being produced by the electrolysis chamber 106 to generate a requested amount of electric energy. The flow rate sensor may be configured in the dissociated hydrogen outlet 127. Upon a determination by the control system 103 that sufficient flow rate of hydrogen is being produced by the electrolysis chamber 106 to generate a requested amount of electric energy, the control system 103 may connect one or more of the hydrogen or oxygen outlets from the electrolysis chamber to a combustion or reaction chamber for energy generation as discussed below. The exemplary electrolysis chamber 106 may emit dissociated oxygen through the dissociated oxygen outlet 130. The dissociated hydrogen may be stored in hydrogen storage 133. The dissociated oxygen may be stored in oxygen storage 136. Stored hydrogen may flow through the hydrogen storage outlet 139. Stored oxygen may flow through the oxygen storage outlet 142. The hydrogen fuel generation control interface 145 governs stored hydrogen flow into the thermal reaction chamber hydrogen inlet 148. The hydrogen fuel generation control interface 145 governs stored oxygen flow into the thermal reaction chamber oxygen inlet 151. The hydrogen fuel generation control interface 145 may be configured to release a mixture of dissociated hydrogen and oxygen into the thermal reaction chamber 154 using a single connection. In the depicted implementation, the hydrogen fuel generation control interface 145 is configured to determine if sufficient hydrogen and oxygen are available to generate a requested unit of electric energy (RUEE). For example, the hydrogen fuel generation control interface 145 may receive sensor data from hydrogen storage 133 or oxygen storage 136, indicating an amount of hydrogen stored. The hydrogen fuel generation control interface 145 may calculate an amount of hydrogen needed to generate the RUEE, as a function of the RUEE value received in an electronic message comprising an electric energy demand request. For example, the hydrogen fuel generation control interface 145 may determine the amount of hydrogen needed to generate the RUEE as a function of electric generator capacity, hydrogen generation rate and/or an amount of water available for generating steam.

In the depicted implementation, the hydrogen fuel generation control interface 145 is configured with circuitry controlling valves governing the fluid connections transferring hydrogen and oxygen to the thermal reaction chamber 154. The hydrogen fuel generation control interface 145 may fluidly connect the thermal reaction chamber hydrogen inlet 148 and the thermal reaction chamber oxygen inlet 151 to the thermal reaction chamber 154 in response to receiving a signal from the control system 103 to activate combination of hydrogen and oxygen in the thermal reaction chamber 154. The hydrogen fuel generation control interface 145 may fluidly disconnect the thermal reaction chamber hydrogen inlet 148 and the thermal reaction chamber oxygen inlet 151 from the thermal reaction chamber 154 in response to receiving a signal from the control system 103 to stop combination of hydrogen and oxygen in the thermal reaction chamber 154. The hydrogen fuel generation control interface 145 may maintain, in a fluidly disconnected state, the thermal reaction chamber hydrogen inlet 148, the thermal reaction chamber oxygen inlet 151 and the thermal reaction chamber 154 in response to receiving a signal from the control system 103 to refrain from combination of hydrogen and oxygen in the thermal reaction chamber 154.

In the depicted implementation, the combination of hydrogen and oxygen in the thermal reaction chamber 154 produces water and heat emitted from the thermal reaction chamber 154 through the thermal reaction chamber outlet 157 to the containment vessel 160. As water and heat accumulate in the containment vessel 160, pressurized steam is emitted from the containment vessel outlet 163 to the steam-powered electric generator 166. In the depicted implementation the steam-powered electric generator 166 is a steam turbine. The steam-powered electric generator 166 produces electric energy using the steam. The electric energy produced from the steam is transferred from the generator electric output 169 through the electric grid control interface 172. In the depicted implementation the electric grid control interface 172 is a bidirectional communication and control interface configured to receive through the electric grid interface 175 an indication of an RUEE requested by the electric grid 178. In the depicted implementation the electric grid interface 175 is a communication network, for example an intranet or internet connection. The electric grid interface 175 may comprise a virtual private network (VPN) connection between the control system 103 and the electric grid 178. In the depicted implementation, the control system 103 is communicatively and operably coupled with the electric current input control interface 121, the hydrogen fuel generation control interface 145 and the electric grid control interface 172. In the depicted implementation, water from condensed steam used by the steam-powered electric generator 166 is recycled through the $H_2O$ byproduct recovery system 181 to the electrolysis chamber 106, for reuse comprising electrolysis for hydrogen generation in a closed loop.

In an illustrative example scenario, an electric grid 178 having a legacy generating plant operating from carbon-based, nuclear, solar, wind, geothermal or hydrodynamic energy sources may be operating at or near capacity. Such a legacy generating plant operating at or near capacity may issue commands to the electric power generation system 100 via the electric grid interface 175. The commands issued by the electric grid 178 may comprise a request to one or more electric power generation system 100 implementations to generate an RUEE on demand. The generated RUEE may be used to power loads local to the electric power generation system 100, such as for example, lights or appliances in a home where the electric power generation system 100 is located. Such powering of loads local to the electric power generation system 100 on demand from an electric grid 178 operating at or near capacity may permit the electric grid 178 to shed load on demand and avoid activating any additional legacy generating plants, using time-shifted energy availability provided by hydrogen generated by electrolysis at a time earlier than the time of the demanded delivery.

Figure 2:
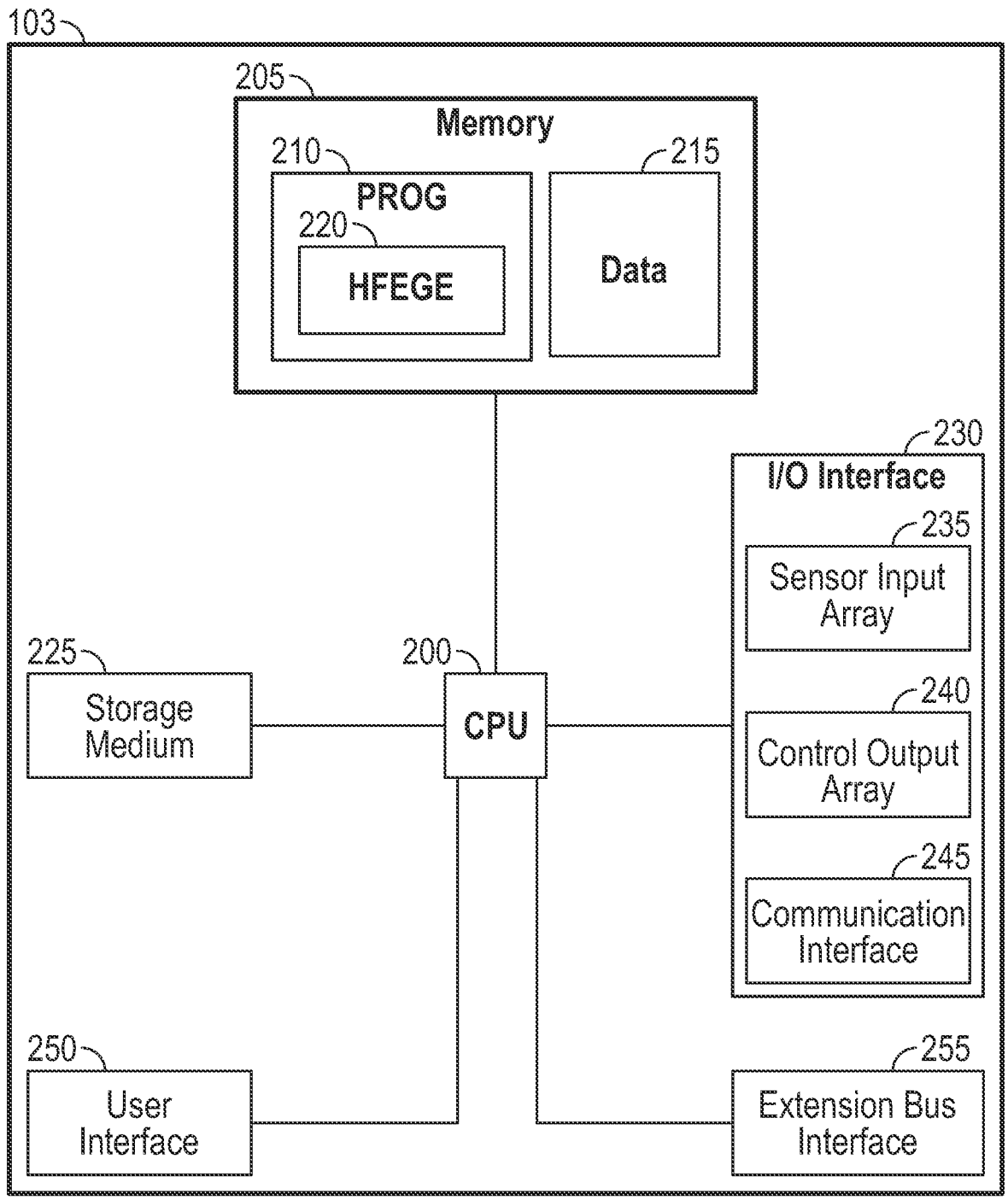
FIG. 2 depicts a structural view of an exemplary control system configured to receive a request for an amount of electric energy, generate hydrogen by dissociating hydrogen from water, store the dissociated hydrogen, determine if sufficient hydrogen has been stored to generate the requested amount of electric energy, refrain from combining the hydrogen with oxygen until sufficient hydrogen has been stored and in response to determining sufficient hydrogen has been stored, activate hydrogen recombination with oxygen to generate the requested amount of electric energy.

FIG. 2 depicts a structural view of an exemplary control system configured to receive a request for an amount of electric energy, generate hydrogen by dissociating hydrogen from water, store the dissociated hydrogen, determine if sufficient hydrogen has been stored to generate the requested amount of electric energy, refrain from combining the hydrogen with oxygen until sufficient hydrogen has been stored and in response to determining sufficient hydrogen has been stored, activate hydrogen recombination with oxygen to generate the requested amount of electric energy.

In FIG. 2, the block diagram of the exemplary control system 103 includes processor 200 and memory 205. The processor 200 is in electrical communication with the memory 205. The depicted memory 205 includes program memory 210 and data memory 215. The depicted program memory 210 includes processor-executable program instructions implementing the hydrogen fuel electric generation engine (HFEGE) 220. The illustrated program memory 210 may encode processor-executable program instructions configured to implement an OS (Operating System). The OS may include processor executable program instructions configured to implement various operations when executed by the processor 200. The OS may be omitted. The illustrated program memory 210 may encode processor-executable program instructions configured to implement various Application Software. The Application Software may include processor executable program instructions configured to implement various operations when executed by the processor 200. The Application Software may be omitted. In the depicted implementation, the processor 200 is communicatively and operably coupled with the storage medium 225. In the depicted implementation, the processor 200 is communicatively and operably coupled with the I/O (Input/Output) interface 230.

In the depicted implementation, the I/O interface 230 includes the sensor input array 235. In the depicted implementation, the sensor input array 235 includes interface circuitry configured to receive sensor information from one or more sensors configured in an exemplary electric power generation system 100 (depicted at least in FIG. 1). For example, the sensor input array 235 may be operably coupled via wired or wireless connection to receive sensor information from one or more of: the electrolysis chamber 106, the photovoltaic array 109, the power bank 112, the electric current input control interface 121, the hydrogen storage 133, the oxygen storage 136, the hydrogen fuel generation control interface 145, the thermal reaction chamber 154, the containment vessel 160, the steam-powered electric generator 166, or the electric grid control interface 172. The sensor information received by the sensor input array 235 may be forwarded to the processor 200. The sensor information received by the sensor input array 235 may comprise, for example, information representing an amount of electric energy requested, an amount of electric energy generated, an amount of electric energy delivered, an amount of electric current available from the photovoltaic array 109, a charge level on the power bank 112, an amount of hydrogen available, an amount of oxygen available, a flow rate of hydrogen from the electrolysis chamber 106 or a flow rate of oxygen from the electrolysis chamber 106.

In the depicted implementation, the I/O interface 230 includes the control output array 240. In the depicted implementation, the control output array 240 includes interface circuitry configured to generate and send control signals controlled by processor 200 to one or more devices or subsystems configured in an exemplary electric power generation system 100 (depicted at least in FIG. 1). For example, the control output array 240 may be operably coupled via wired or wireless connection to send control signals to one or more of: the electrolysis chamber 106, the photovoltaic array 109, the power bank 112, the electric current input control interface 121, the hydrogen storage 133, the oxygen storage 136, the hydrogen fuel generation control interface 145, the thermal reaction chamber 154, the containment vessel 160, the steam-powered electric generator 166, or the electric grid control interface 172. The control signals sent by the control output array 240 may comprise, for example, signals controlling an amount of electric energy generated, an amount of electric energy delivered, an amount of electric current used from the photovoltaic array 109, charging the power bank 112, releasing or refraining from releasing available hydrogen, releasing or refraining from releasing available oxygen, adjusting a flow rate of hydrogen from the electrolysis chamber 106 or a adjusting a flow rate of oxygen from the electrolysis chamber 106.

In the depicted implementation, the I.O interface 230 includes the communication interface 245. The communication interface 245 may comprise a network interface. The network interface may be a wireless network interface. The network interface may be a Wi-Fi interface. The network interface may be a Bluetooth® interface. The communication interface 245 may include more than one network interface. The network interface may be a wireline interface. The network interface may be omitted.

In the depicted implementation, the processor 200 is communicatively and operably coupled with the user interface 250. The user interface may be, for example, an industrial keyboard with an alphanumeric liquid crystal display. The user interface 250 may comprise a web server hosting a web-service based user interface providing operable access to the control system 103 features. The web-service based user interface may be made available by the processor 200 to authenticated users via the internet or through a VPN.

In the depicted implementation, the processor 200 is communicatively and operably coupled with the extension bus interface 255. In the depicted implementation, the extension bus interface 255 is configured to operably interconnect multiple control system 103 instances on an addressable bus network, permitting resource sharing and hot swap/standby replacement of an individual failed control system 103. For example, one control system 103 may govern hydrogen generation from multiple electrolysis chamber 106 instances in different locations, via wireless connections with the individual electric current input control interface 121, hydrogen storage 133, oxygen storage 136, hydrogen fuel generation control interface 145, thermal reaction chamber 154, containment vessel 160, steam-powered electric generator 166 and electric grid control interface 172 configured in the respective locations. Hot backup scenarios comprising multiple control system 103 implementations each monitoring devices and subsystems at their respective locations are contemplated, such that when one control system 103 fails another control system 103 assumes control responsibility at the location that experienced the failure.

Useful examples of the illustrated control system 103 include, but are not limited to, embedded controllers, personal computers, servers, tablet PCs, smartphones, or other computing devices. Multiple control system 103 devices may be operably linked to form a network in a manner as to distribute and share one or more resources, such as clustered computing devices and server banks/farms. Various arrangements of such general-purpose multi-unit networks suitable for implementations of the disclosure, their typical configuration, and standardized communication links are well known to one skilled in the art. An exemplary control system 103 design may be realized in a distributed implementation. Some control system 103 designs may be partitioned between a client device, such as, for example, a phone, and a more powerful server system. A control system 103 partition hosted on a PC or mobile device may choose to delegate some parts of computation, such as, for example, machine learning or deep learning, to a host server. A client device partition may delegate computation-intensive tasks to a host server to take advantage of a more powerful processor, or to offload excess work. Some control system 103 devices may be configured with a mobile chip including an engine adapted to implement specialized processing, such as, for example, neural networks, machine learning, artificial intelligence, image recognition, audio processing, or digital signal processing. Such an engine adapted to specialized processing may have sufficient processing power to implement some control system 103 features. However, an exemplary control system 103 may be configured to operate on a device with less processing power, such as, for example, various gaming consoles, which may not have sufficient processor power, or a suitable CPU architecture, to adequately support control system 103. Various implementations configured to operate on a such a device with reduced processor power may work in conjunction with a more powerful server system.

Figure 3:
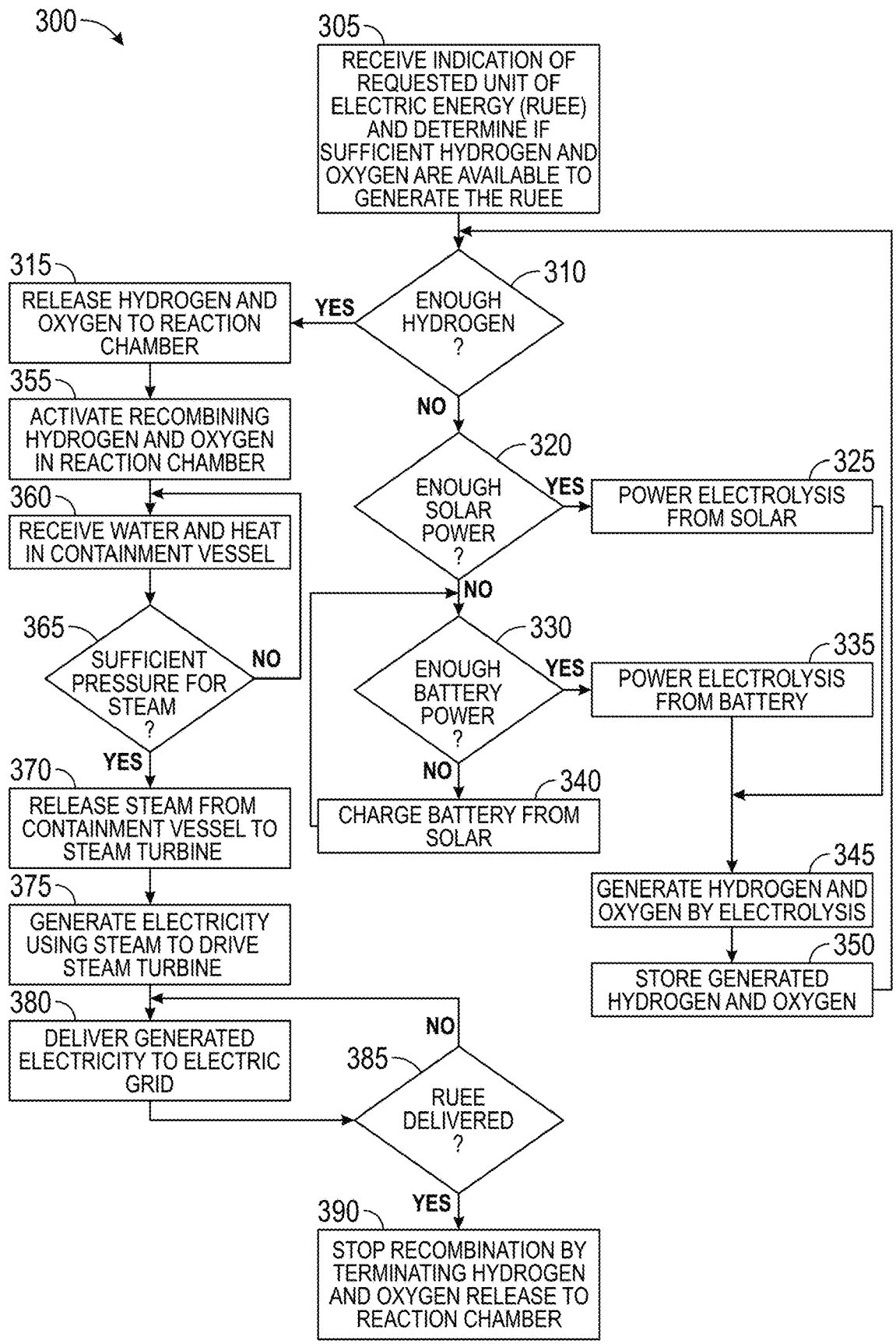
FIG. 3 depicts a process flow of an exemplary HEF-TEG control process configured to govern receiving a request for an amount of electric energy, generating hydrogen by dissociating hydrogen from water, storing the dissociated hydrogen, determining if sufficient hydrogen has been stored to generate the requested amount of electric energy, refraining from combining the hydrogen with oxygen until sufficient hydrogen has been stored and in response to determining sufficient hydrogen has been stored, activating hydrogen recombination with oxygen to generate the requested amount of electric energy.

FIG. 3 depicts a process flow of an exemplary hydrogen fuel electric generation engine (HFEGE) 220 (depicted at least in FIG. 2) configured to govern receiving a request for an amount of electric energy, generating hydrogen by dissociating hydrogen from water, storing the dissociated hydrogen, determining if sufficient hydrogen has been stored to generate the requested amount of electric energy, refraining from combining the hydrogen with oxygen until sufficient hydrogen has been stored and in response to determining sufficient hydrogen has been stored, activating hydrogen recombination with oxygen to generate the requested amount of electric energy. In FIG. 3, the depicted method is given from the perspective of the HFEGE 220 implemented via processor-executable program instructions executing on the control system 103 processor 200, depicted at least in FIG. 2. In the illustrated implementation, the HFEGE 220 executes as program instructions on the processor 200 configured in the HFEGE 220 host control system 103, depicted in at least FIG. 1. In some implementations, the HFEGE 220 may execute as a cloud service communicatively and operatively coupled with system services, hardware resources, or software elements local to and/or external to the HFEGE 220 host control system 103. The depicted method 300 begins at step 305 with the processor 200 receiving an indication of a requested unit of electric energy (RUEE). The indication of the RUEE may be received in an electronic message from an electric grid or from a local load such as an appliance. The indication of the RUEE may be received from a user interface. In response to receiving the indication of the RUEE, the processor 200 determines the amount of hydrogen available and if sufficient hydrogen and oxygen are available to generate the RUEE. The processor 200 may determine if sufficient hydrogen and oxygen are available as a function of sensor information.

Then, the method continues at step 310 with the processor 200 performing a test to determine whether to generate hydrogen or generate electricity, depending on the amount of hydrogen available and the RUEE. The processor 200 may use sensor information to determine the amount of hydrogen available and compare the amount of hydrogen available to a minimum amount of hydrogen needed to generate the RUEE. The minimum amount of hydrogen needed to generate the RUEE may be determined by the processor 200 as a function of system component design parameters such as for example, amount of water available for making steam, water temperature, thermal reaction chamber capacity, containment vessel size, ambient temperature, steam turbine or generator efficiency, thermal reaction chamber to containment vessel heat conduction efficiency and other system design parameters that would be known to one of ordinary skill in view of the present disclosure. Upon a determination by the processor 200 enough hydrogen to generate the RUEE is available, the method continues at step 315. Upon a determination by the processor 200 enough hydrogen to generate the RUEE is not available, the method continues at step 320. The amount of hydrogen and oxygen available may be based on amounts stored. The amount of hydrogen and oxygen available may be based on flow rates of hydrogen and oxygen from an electrolyzer. In some cases, the amount of oxygen available may be based on an amount of oxygen available from the ambient atmosphere. For example, in some cases, determination of sufficient hydrogen to generate the RUEE may be based on a finding by the processor that a flow rate of hydrogen from an electrolyzer is sufficient to generate the RUEE without using stored hydrogen. Determination of sufficient hydrogen to generate the RUEE may be based on a finding by the processor that a flow rate of hydrogen from an electrolyzer is sufficient to generate the RUEE without using any stored hydrogen or any stored oxygen. For example, oxygen from the ambient atmosphere may be used to combust hydrogen in the thermal reaction chamber, whether or not the hydrogen was stored. In some cases, the system may combust hydrogen that is a mixture of stored hydrogen and a hydrogen flow produced in real time by an electrolyzer. An implementation may be configured to determine the amount of available hydrogen for generating the RUEE as a function of adding a flow rate of hydrogen from hydrogen storage to a flow rate of hydrogen produced in real time by an electrolyzer.

At step 315, the processor 200 sends one or more control signals operating one or more valves to release hydrogen to the reaction chamber and the method continues at step 355.

At step 355 the processor 200 sends one or more control signals operating one or more valves to activate recombination of hydrogen and oxygen in the reaction chamber, generating water and heat, and the method continues at step 360.

At step 360, the processor 200 sends one or more control signals operating one or more valves to cause the containment vessel to receive the water and heat generated in the reaction chamber, and the method continues at step 365, At step 365 the processor 200 performs a test based on sensor data, to determine if sufficient pressure has developed in the containment vessel to produce enough steam to generate the RUEE. The sensor data may comprise data received from one or more sensor configured in the containment vessel. Upon a determination by the processor 200 sufficient pressure has developed, the method continues at step 370. Upon a determination by the processor 200 sufficient pressure has not developed, the method continues at step 360.

At step 370, the processor 200 sends one or more control signals operating one or more valves to release steam from the containment vessel to the steam turbine and the method continues at step 375.

At step 375, the processor 200 sends one or more control signals activating the steam turbine to use the steam to generate electricity and the method continues at step 380.

At step 380, the processor 200 sends one or more control signals to an electric grid interface to enable delivering electricity generated by the steam turbine to the electric grid and the method continues at step 385.

At step 385, the processor 200 performs a test to determine if the RUEE has been delivered. For example, the RUEE may be an amount of electric energy delivered for a period of time. The processor 200 may use sensor data representing an amount of current delivered over a period of time and compare the sensor data with RUEE to determine if the RUEE has been delivered. Upon a determination by the processor 200 the RUEE has been delivered, the method continues at step 390. Upon a determination by the processor 200 the RUEE has not been delivered, the method continues at step 380.

At step 390, the processor sends one or more control signals governing valves or fluid connections, to stop recombining hydrogen and oxygen in the reaction chamber by terminating hydrogen and oxygen release.

Returning to step 310, wherein upon a determination by the processor 200 enough hydrogen to generate the RUEE is not available, the method continues at step 320. At step 320, the processor 200 performs a test to determine if sufficient solar power is available from the photovoltaic array to generate hydrogen using the electrolysis chamber. Upon a determination by the processor 200 sufficient solar power is available from the photovoltaic array to generate hydrogen using the electrolysis chamber, the method continues at step 325. Upon a determination by the processor 200 sufficient solar power is not available from the photovoltaic array to generate hydrogen using the electrolysis chamber, the method continues at step 330.

At step 325 the processor 200 sends one or more control signals to connect the photovoltaic array to the electrolysis chamber electric current input, to generate hydrogen using the electrolysis chamber and the method continues at step 345.

At step 330, the processor 200 performs a test to determine if sufficient battery power is available to generate hydrogen using the electrolysis chamber. Upon a determination by the processor 200 sufficient battery power is available to generate hydrogen using the electrolysis chamber, the method continues at step 335. Upon a determination by the processor 200 sufficient battery power is not available to generate hydrogen using the electrolysis chamber, the method continues at step 340 by charging the battery using the photovoltaic array. When the processor 200 determines the battery is sufficiently charged to generate hydrogen using the electrolysis chamber, the method may continue at step 335.

At step 335 the processor 200 sends one or more control signals to connect the battery to the electrolysis chamber electric current input, to generate hydrogen using the electrolysis chamber and the method continues at step 345.

At step 345 the processor 200 sends one or more control signals to fluidly connect the electrolysis chamber hydrogen and oxygen outlets to hydrogen and oxygen storage. The method continues at step 350.

At step 350, the processor 200 permits oxygen and hydrogen generated by electrolysis to accumulate in hydrogen and oxygen storage. The method may continue at step 310 with the processor 200 monitoring sensor data from the hydrogen and oxygen storage, and in response to determining sufficient hydrogen has been stored to generate the RUEE, the processor may proceed to step 315 to begin generating the RUEE.

In some implementations, the method may repeat. In various implementations, the method may end.

Figure 4:
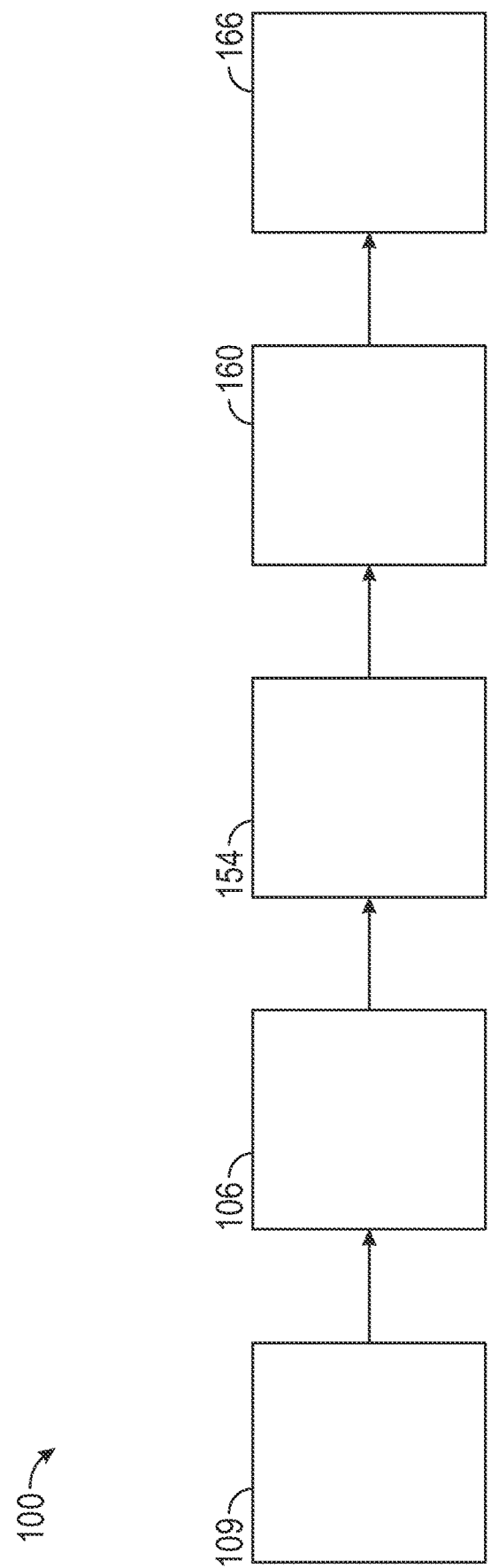
FIG. 4 depicts an exemplary HEF-TEG process.

FIG. 4 depicts an exemplary HEF-TEG process. The depicted exemplary HEF-TEG process may comprise: the photovoltaic array 109, the electrolysis chamber 106, the thermal reaction chamber 154, the containment vessel 160, and the steam-powered electric generator 166. The steam-powered electric generator 166 may be referred to as a turbine/generator.

Photovoltaic Array

The photovoltaic array 109 may be used in a first step of an exemplary process. The photovoltaic array 109 may comprise a plurality of photovoltaic cells mounted on an array. The electricity produced by the photovoltaic array 109 may be sent to the electrolysis chamber 106 to provide electricity for the electrolysis process and/or to recharge a power bank used for nighttime fuel production.

An exemplary Photovoltaic Array may comprise an array of unspecified dimensions having an unspecified number of photovoltaic cells mounted to the array's surface area. In an illustrative example, monocrystal photovoltaic cells may be a suggested solar cell of choice as this type of photovoltaic cell has the capability to produce electricity in cloudy and inclement weather, and in low illumination environments. Each photovoltaic cell may be connected to the other photovoltaic cells to collectively provide electricity to the electrolysis chamber/electrolysis pool for water separation and hydrogen generation. Electrical current sensors and power regulators may monitor and control the operation of the Photovoltaic Array via the operational control system. Emergency power shutoff breakers may be located on power transfer cables connecting the Photovoltaic Array to the electrolysis chamber. The Emergency power shutoff breakers may be controlled by the operational control system. The photovoltaic array also provides the electricity for recharging a nocturnal power supply via a feeder cable connected to each power transfer cable. The feeder cable may be attached to the power bank for recharging during daylight hours. Electrical flow regulators and sensors may be attached to each feeder cable. The regulators and sensors may be monitored and controlled by the operations control system. The amount of electricity sent to and released from the nocturnal power supply may be regulated by the operational control system.

Electrolysis Chamber

The electrolysis chamber 106 may be used in a second step of an exemplary process. The electrolysis chamber 106 is where electrolysis occurs, splitting the water in the electrolysis chamber 106 into component parts of hydrogen and oxygen. Both hydrogen and oxygen gases are collected after electrolysis. The hydrogen and oxygen gases may be sent together to the thermal reaction chamber 154. The hydrogen and oxygen gases provide the energy for thermal reaction in the thermal reaction chamber 154.

An exemplary electrolysis chamber/electrolysis pool may be an equilateral structure, of unspecified size or depth (standard concrete with a MARCITE lining is the suggested material of choice). The electrolysis chamber may be filled with water to a specified depth (depth of water may be monitored and controlled by the operations control system). The base or floor of the electrolysis pool may sit on a foundation of specially compacted substrate. The top of the electrolysis chamber may be comprised of an unspecified molded material, of unspecified size, that forms the cover for the pool. The cover may be anchored along the sides of the pool. The top may be molded to create single electrolysis pods of unspecified numbers. Two single pods (one for the cation and one for the anion) constitute a single electrolysis pod. There may be rows of electrolysis pods running linearly along the horizontal axis of the electrolysis pool. The depth of the water in the electrolysis pool is determined by a set water line and is monitored and controlled by the operations control system using fill sensors.

Transiting over the top of each individual electrolysis pod running linearly and vertically parallel to the rows of electrolysis pods, is the gas accumulation line. The gas accumulation line collects the $H_2$ and $O_2$ gases produced by hydro electrolysis and is connected to each single electrolysis pod via a gas ventilation tube located at the top of each single pod. The two separate gases $H_2$ and $O_2$ may be remixed together within the Gas Accumulation Line and the $O_2H_2$ gas is transported towards the containment vessel. The gas accumulation line terminates at the end of the Electrolysis Pool closest to the containment vessel respectively and is connected to either fuel line #1 or fuel line #2 depending on the position of the gas accumulation line relative to the horizontal axes of the pool. Between the terminus of the gas accumulation line and the connection point to the fuel line is a control valve, flow sensor, and pressure sensor that are monitored and controlled by the operations control system. A pump is connected to each fuel line to facilitate movement of the $O_2H_2$ gas through the gas accumulation line and fuel lines, and then through the containment vessel into the thermal reaction chamber for utilization. The composition of the fuel line may change from stainless steel to tungsten at the point of entry on the outer layer of the containment vessel where the fuel line begins entry into the containment vessel.

External to the Electrolysis Pool, at the end closest respectively to the photovoltaic array, may be dual insulated power transfer cables that conduct the electricity from the Photovoltaic Array to the Electrolysis Pool for use in water separation. One insulated cable is the Cation power distribution cable, the other insulated cable is the Anion power distribution cable. Both insulated cables transit from the Photovoltaic array underneath the entire length of the Electrolysis Pool, at an unspecified depth, and are connected to each individual feeder rod for each pod depending on if the rod is specified to be a Cation rod or an Anion rod. On the electrolysis pool floor are $H_2O$ refill access ports (of unspecified numbers) with a backflow prevention valve connected at the terminus of each access port. The access ports are connected to the $H_2O$ refill supply line (a circular pipe of unspecified diameter or length. Polyvinyl chloride is the suggested material of choice for this pipe). The pipe may be located beneath both insulated power distribution cables which may transit the entire length of the Electrolysis Pool. The $H_2O$ refill supply line is connected to the Main $H_2O$ replenishment line from the condenser pool of the Condensation System. There may be a Gas Accumulation Line, an $H_2O$ refill supply line, a Cation power distribution line and an Anion power distribution line for each Electrolysis Pod row that may transit the entire length of the row. Voltage sensors on both power distribution cables, pressure and flow sensors on both the Gas Accumulation Line and the $H_2O$ refill supply line, are monitored and controlled by the operations control system.

An exemplary electrolysis pod may be comprised of two single electrolysis pods which are separated from each other by a pod divider. The top of the electrolysis pod forms a funnel terminating at the Gas Ventilation Tube which may be connected to the Gas Accumulation Line at one end and terminating at the other end at the pod divider. The pod divider extends down about two-thirds the distance to the floor of the electrolysis pool. The pod divider partially separates the Cation electrolysis pod from the Anion electrolysis pod. In the center of each single pod may be a ridged feeder rod comprised of insulated copper. The rod is connected at the base to either the Cation power distribution cable or the Anion power distribution cable at a junction point comprised of a voltage regulator for the feeder rod. At the terminus end of each feeder rod a copper wire electrolysis mesh is connected to the rod. The use of a copper wire mesh significantly increases the surface area of the rod for more efficient hydro electrolysis. Voltage sensors are attached to the feeder rod and electrolysis mesh. The operations control system monitors and controls each pod.

Thermal Reaction Chamber

The thermal reaction chamber 154 may be used in a third step of an exemplary process. In some implementations the thermal reaction chamber may be located within the containment vessel 160. After receiving the hydrogen and oxygen gases from the electrolysis chamber 106, the hydrogen and oxygen gases are combined in the thermal reaction chamber 154 via a thermal reaction which produces heat and water as byproducts. The water may be condensed in an ancillary system for reuse or vented into the atmosphere. The heat produced from the reaction may be provided to the containment vessel 160 via thermal conduction.

An exemplary thermal reaction chamber/containment vessel may comprise a cylindrical shaped vessel, of unspecified size, with both ends forming half spherical end caps of unspecified size. Due to the high reaction temperatures (3,000-5,000 Degree Fahrenheit range) found in the reaction chamber and the ultra-high-pressure environment of the containment vessel (vapor pressure phenomenon), the composition of the Thermal Reaction Chamber may have a high melting point/high Mohs hardness scale rating. For example, tungsten, with a melting point of 6,192 degrees and a rating of 7.5-9.0 on the Mohs hardness scale with diamond rating 10.0 on the scale, is one suggested material choice. The thermal reaction between $O_2$ and $H_2$ occurs in the thermal reaction area.

The Thermal Reaction Chamber may be positioned vertically and on a 0-degree vertical center axis of the Containment Vessel. The Thermal Reaction Chamber may be contained within the Containment Vessel (see for example Thermal Reaction Chamber/Containment Vessel Plan and Elevation views). The thermal reaction chamber may be secured in position and to the floor of the containment vessel by the reaction chamber seating frame (suggested to be composed of tungsten also). At the top of the chamber may be the post reaction vent that conducts the post reaction exhaust to the condensation system for recovery of the $H_2O$ byproduct from the reaction. Within the post reaction vent may be a pressure sensor which is tied into the control system.

On the lower side of the thermal reaction chamber, just above the start of the curve of the half spherical end cap, may be dual fuel lines, transporting the $O_2H_2$ gas from the Electrolysis Pool. The dual fuel lines transit through the Containment Vessel into the Thermal Reaction Chamber with a gas dispersement nozzle attached at the terminal end of each fuel line. In some implementations a static electricity system may be configured to attract the free electron left over from the thermal reaction. The static electricity system may comprise an electrically grounded conductive strap or rod in electrical communication with the thermal reaction chamber. The electrically grounded conductive strap or rod may be located on the outside of the thermal reaction chamber. The electrically grounded conductive strap or rod may be located on the outside of the containment vessel. In an illustrative example the static electricity system may be designed to attract the free electron left over from the thermal reaction and direct the free electron to electrical ground. Directing the free electron to ground may prevent static electrical build up on the thermal reaction chamber that may result from sustained thermal reaction.

The fuel lines may be made of stainless steel up to the Containment Vessel outer wall. After transiting the Containment Vessel outer wall the fuel lines may be made of tungsten, from the Containment Vessel outer wall to the gas disbursement nozzle. In an illustrative example, tungsten may be a material of choice for the fuel lines after transiting the Containment Vessel outer wall, due to the high-temperature and high-pressure environments. See, for example the Thermal Reaction Chamber/Containment Vessel Plan and Elevation views for illustration.

Containment Vessel

The containment vessel 160 may be used in a fourth step of an exemplary process. The containment vessel 160 may be filled with water. The containment vessel 160 may contain the thermal reaction chamber 154. The thermal reaction chamber 154 may be surrounded by water retained within the containment vessel 160. In an illustrative example, the water retained by the containment vessel 160 may absorb the heat being transferred from the thermal reaction chamber 154 by conduction. The heat absorbed by the water may turn the water into steam within the containment vessel 160. In an illustrative example, as an exemplary process may proceed, an increasing quantity of steam created within the containment vessel 160 may generate increasing pressure via pressurized steam within the containment vessel 160. The pressurized steam may be sent to the steam-powered electric generator 166.

An exemplary Containment Vessel may be a cylindrical shaped vessel, of unspecified size, with one end forming a half spherical end cap and the other end forming a flat floor in the vessel which sits upon a foundation of specially compacted substrate of unspecified content, mixture, and/or material. The operating pressure within the Containment Vessel may be extremely high due to the vapor pressure phenomenon which states that the vapor pressure of liquids increases with the temperature of the liquid. The Containment Vessel may comprise of 3 layers. The outermost layer may be composed of reinforced concrete of unspecified thickness, rating, and/or consistency. The interior of the reinforced concrete may be lined with the middle layer composed of high yield strength stainless steel of unspecified thickness. The interior of the middle layer may be lined with the inner layer composed of HRSI tiles (High-Temperature Reusable Surface Insulation tiles, which may be similar to the black tiles used on the Space Shuttle thermal protection system). The HRSI tiles may maximize thermal heat retainment and minimize heat loss.

The Containment Vessel may be filled with water to a specified level within the vessel, to completely immerse the Thermal Reaction Chamber in water within the Containment Vessel. In an illustrative example, heat generated from the Thermal Reaction Chamber converts water in the Containment Vessel from liquid to steam. Citing the vapor pressure phenomenon, the ultra-pressurized steam may then be transported to a steam turbine generator assembly by the primary pressurized steam line. Flow and pressure sensors may be attached to the primary pressurized steam line for monitoring by an operations control system. The water level may be monitored by the operations control system via fill sensors. Attached to the half spheric end cap, off center from the vertical axis of the chamber, may be an emergency pressure relief valve. The emergency pressure relief valve may be calibrated to automatically open when containment vessel interior pressure exceeds design limits. The emergency pressure relief valve may be designed to operate autonomously in the event of catastrophic failure of the operations control system.

Transiting underneath the Containment Vessel, at an unspecified depth, may be the main $H_2O$ replenishment line (a circular pipe of unspecified diameter and length. Polyvinylchloride is the suggested material for the main $H_2O$ replenishment line due to established durability). The main $H_2O$ replenishment line may run from the condensation pool to the Electrolysis Pool. The main $H_2O$ replenishment line is the main replenishment source of water for the Electrolysis Pool. The main $H_2O$ replenishment line may also be the feeder line for the Containment Vessel's water replenishment. Flow and pressure sensors may be attached to the main $H_2O$ replenishment line for monitoring by the operational control system. Replenishment of water to the Containment Vessel may be accomplished by a fill port located on the floor of the containment vessel with a backflow prevention valve attached to the port. The fill port may be connected to the main $H_2O$ replenishment line by a feeder line (a circular pipe of unspecified diameter and length). A high-pressure pump/valve may be connected to the feeder line (for pumping of water into the containment vessel under ultra-high pressure. The high-pressure pump/valve may be controlled by the operational control system. Pressure/flow sensors may be attached to the feeder line for monitoring and control by the operations control system. (Type 316 stainless steel may be a suggested material for the feeder line due to the ultra-high pressure associated with the high-pressure pump/valve.) Exterior to the outer layer of the Containment vessel and attached to each fuel line may be flow valves, flow pumps, pressure/flow sensors, and a flash back arrestor/emergency vent valve and pump (for prevention of back flash combustion from the thermal reaction chamber and emergency venting of the fuel lines).

Steam-powered Electric Generator

The steam-powered electric generator 166 may be used in a fifth step of an exemplary process. The steam-powered electric generator 166 may receive pressurized steam from the containment vessel 160. The steam-powered electric generator 166 may be configured with a steam turbine adapted to spin in response to the pressure from the pressurized steam received from the containment vessel 160. The spinning steam turbine may cause the steam-powered electric generator 166 to produce electricity. The electricity produced may be provided to a power grid for consumption. The power grid may be a public power grid.

An exemplary steam turbine generator may be an industrial turbine generator similar to those that may be used in a conventional electrical power plant. In an illustrative example, the steam turbine generator may have a generating capacity of at least ½ gigawatt hours. The steam turbine generator may receive ultra high-pressure steam from the containment vessel. The steam turbine generator uses the received steam to spin the turbine, which rotates the generator and produces electricity that may be sent to the electric grid for public use. The steam may then be conducted through a low-pressure steam line to a condensation system. The condensation system may be configured to convert the steam to a liquid form for cooling, recovery, and reuse of the water. The recovered water may be stored in a condensation pool for later use. The steam turbine generator system may comprise flow pumps, control valves, pressure and flow sensors for monitoring and control via the operational control system.

Ancillary Systems

An HEF-TEG implementation may comprise one or more ancillary systems. One ancillary system may be the power bank 112 (depicted at least by FIG. 1). The power bank 112 may be recharged by the photovoltaic array 109. The power bank 112 may be charged by the photovoltaic array 109. The power bank 112 may be used to power the electrolysis chamber 106 for nighttime fuel production. The photovoltaic array 109 may be used to power the electrolysis chamber 106 for daytime fuel production. Another ancillary system may be the $H_2O$ byproduct recovery system 181 (depicted at least by FIG. 1). In an illustrative example, the $H_2O$ byproduct recovery system 181 may be configured to provide condensation and subsequent reuse of the water produced during thermal reaction.

An exemplary condensation system may comprise a condenser system and a condenser pool. An exemplary condenser system may comprise a series of industrial grade heat exchangers configured to accept process water streams in gaseous form from a post reaction vent and the steam turbine generators, cool the combined inflow steam to below dew point and discharge the water in liquid form to the condenser pool for storage. The discharge water may be transported to the condenser pool through a main water transfer pipe with control valves, pressure sensors and flow sensors attached at each end for monitoring and control. A high flow industrial grade pump (monitored and controlled by the operations control system) may be connected to the water transport pipe to facilitate the transfer. An exemplary condenser system may be utilized for the recovery and reuse of the water byproduct from the thermal reaction chamber and the outflow steam from the steam turbine generator. An exemplary operations control system may be configured to use a combination of temperature sensors, flow sensors, pressure sensors and control valves within the heat exchangers to monitor and control the condenser system.

An exemplary condenser pool may comprise an equilateral structure. The condenser pool may be constructed from material comprising concrete with a MARCITE lining. The condenser pool may sit on a foundation of compacted substrate. The condenser pool may serve as a reservoir/retention vessel for the outflow from the condenser system. The condenser pool may be used to replenish the containment vessel and the electrolysis chamber via the main $H_2O$ replenishment line. Flow sensors, fill sensors, and control valves attached to the condenser pool may be monitored and controlled by the operations control system. There may be an external source water line attached to the condenser pool for water replacement from an outside source (either a well or from the local municipal water system) to compensate for evaporation and unrecoverable water loss. The main replenishment line may be a circular pipe which transits from the condenser pool, beneath the containment vessel. The pipe may terminate at the electrolysis chamber. A water pump may be configured to facilitate the transport of water through the main replenishment line. Flow sensors, pressure sensors, and control valves attached to the main replenishment line, as well as the water pump, may be monitored and controlled by the operations control system.

Operational Control System

An exemplary operational control system may comprise a combination of an artificial intelligence (AI) monitor and a control software program. The AI system may monitor the entire operation of an exemplary HEF-TEG Process. Upon detecting any abnormalities outside of nominal operating parameters, the AI may implement corrective action using the control software program to operate valves and/or pumps, activate combustion, increase flow rate or stop combustion, to achieve safe and efficient operation under varying conditions. The control software program may be configured to aid the AI in achieving safe and efficient operation by interface communication with the various valves, pumps and sensors dispersed throughout the process. Human operators may be enabled to monitor operations and intervene, when necessary, by utilizing control/monitoring stations.

Figure 5:
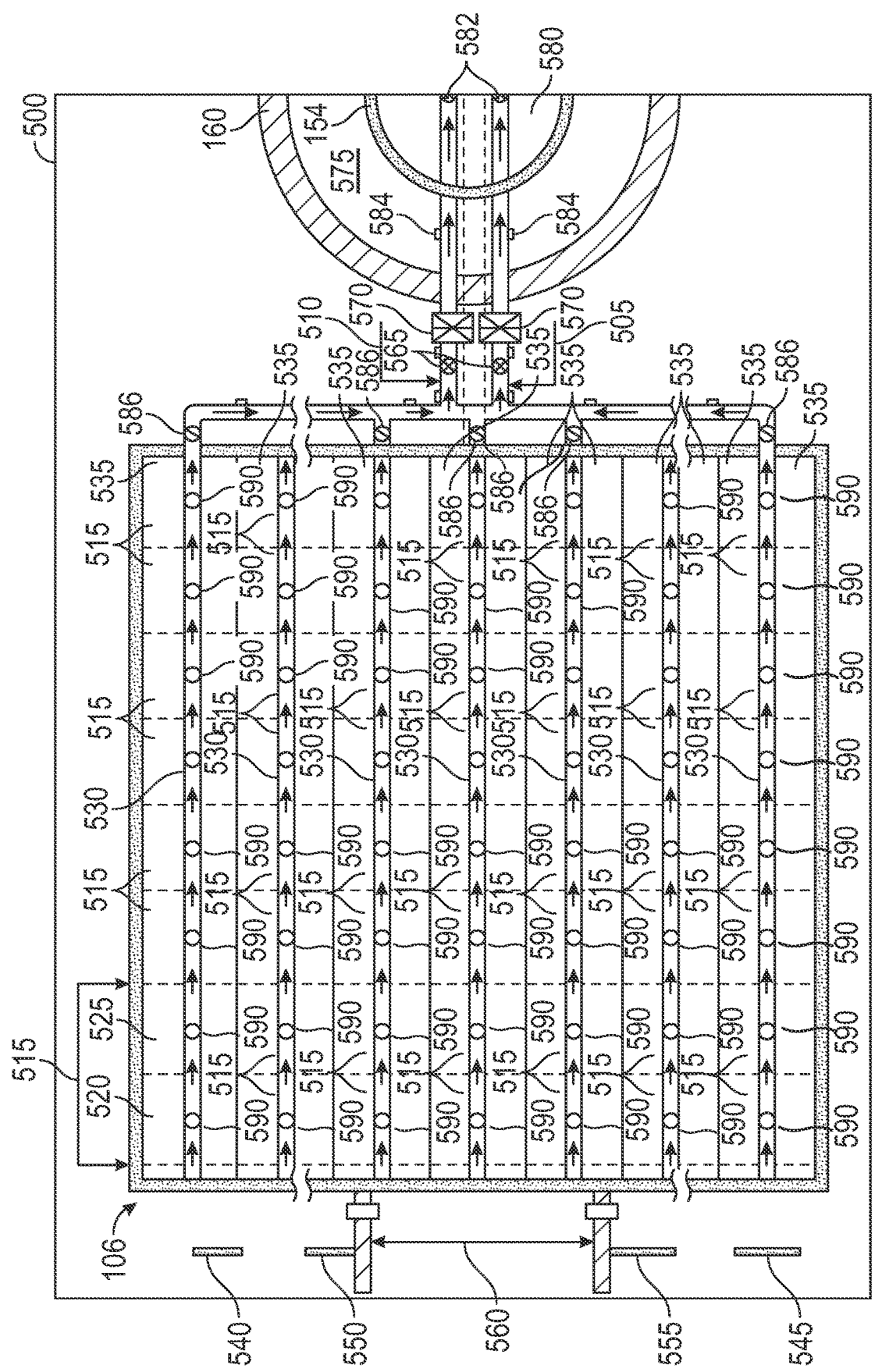
FIG. 5 depicts a plan view of an exemplary electrolysis pool/electrolysis chamber.

FIG. 5 depicts a plan view of an exemplary electrolysis pool/electrolysis chamber. In FIG. 5, the plan view 500 depicts the exemplary electrolysis chamber 106, the containment vessel 160 and the thermal reaction chamber 154. In the depicted implementation, the electrolysis chamber 106 is fluidly connected with the thermal reaction chamber 154 by the first fuel line connection 505 and the second fuel line connection 510. In the depicted implementation the first fuel line connection 505 and the second fuel line connection 510 are configured to supply hydrogen and oxygen gases from the electrolysis chamber 106 to the thermal reaction chamber 154. An implementation may be configured with any number of fuel line connections. In the depicted implementation the thermal reaction chamber 154 is retained within the containment vessel 160. In some implementations the thermal reaction chamber 154 may be separated from the containment vessel 160. In the depicted implementation the electrolysis chamber 106 comprises a plurality of electrolysis pods 515. In the depicted implementation the plurality of electrolysis pods 515 are arranged in a matrix. In the depicted implementation each electrolysis pod 515 of the plurality of electrolysis pods 515 comprises a cation pod 520 and an anion pod 525. In the depicted implementation the plurality of electrolysis pods 515 may be in fluid communication by gas accumulation lines 530. In the depicted implementation, the matrix arrangement of the plurality of electrolysis pods 515 is configured in rows 535 of electrolysis pods 515. In the depicted implementation each row 535 of electrolysis pods comprises four electrolysis pods 515. An implementation may comprise any number of electrolysis pods 515 per row 535. In the depicted implementation each electrolysis pod 515 of the plurality of electrolysis pods 515 in each row 535 is operably connected in fluid communication by a gas accumulation line 530.

In the implementation depicted by FIG. 5, the exemplary electrolysis chamber 106 comprises the nocturnal power transfer cable 540 and the nocturnal power transfer cable 545. The nocturnal power transfer cable 540 and the nocturnal power transfer cable 545 may be operably connected by a control system to an electric power source such as the power bank 112 (depicted at least by FIG. 1). The power bank 112 may supply electric power to the electrolysis chamber 106 for nighttime fuel production through the nocturnal power transfer cable 540 and the nocturnal power transfer cable 545. In the depicted implementation the electrolysis chamber 106 comprises the emergency power shutoff 550 and the emergency power shutoff 555 that are configured to govern electric current supply to the electrolysis chamber 106 from the power bank 112 or the photovoltaic array 109 (depicted at least by FIG. 1). In the depicted implementation the electrolysis chamber 106 includes the daytime power transfer cable 560 that may be operably connected by the control system to the electrolysis chamber 106. The control system may be configured with one or more sensors adapted to detect anomalous current or voltage in the nocturnal power transfer cable 545 or the daytime power transfer cable 560. The control system may be configured to operate the emergency power shutoff 550 or the emergency power shutoff 555 to disconnect power to the electrolysis chamber 106 when an anomalous current or voltage in the nocturnal power transfer cable 540,545 or the daytime power transfer cable 560 is detected by the control system. The emergency power shutoff 550 or the emergency power shutoff 555 may be configured to be operated manually on site. The emergency power shutoff 550 or the emergency power shutoff 555 may be configured to be operated remotely, for example in response to a shutoff command received from an electric power grid management system through a communication network.

In the depicted implementation the exemplary electrolysis chamber 106 comprises one gas flow pump 565 configured in each of the first fuel line connection 505 and the second fuel line connection 510. In the depicted implementation each of the first fuel line connection 505 and the second fuel line connection 510 are in fluid communication with a respective flashback arrestor/emergency vent valve/pump 570. In the depicted implementation the flashback arrestor/emergency vent valve/pump 570 pair prevent flashback combustion from the thermal reaction chamber and emergency venting of the first fuel line connection 505 and the second fuel line connection 510. In the depicted implementation, the containment vessel 160 surrounds the thermal reaction chamber 154. In the depicted implementation water 575 retained by the containment vessel 160 surrounds the thermal reaction chamber 154. In an illustrative example, the heat produced from the reaction in the thermal reaction chamber 154 may be provided to the containment vessel 160 via thermal conduction. The heat produced from the reaction in the thermal reaction area 580 within the thermal reaction chamber 154 may be provided to the containment vessel 160 via thermal conduction through the water 575. In the depicted implementation the first fuel line connection 505 and the second fuel line connection 510 are in fluid communication with the thermal reaction chamber 154 through the gas disbursement nozzles 582.

The gas disbursement nozzles 582 may be in fluid communication with the flashback arrestor/emergency vent valve/pump 570 pair. The flashback arrestor/emergency vent valve/pump 570 pair may comprise a bubbler between the electrolyzer and the thermal reaction chamber 154. The bubblers may be configured to isolate the electrolyzer from a flame front resulting from hydrogen combustion in the thermal reaction chamber 154. Isolating the electrolyzer from flames resulting from the thermal reaction chamber 154 may prevent the flame front from propagating back through the flame-arrestor and detonating the electrolyzer. In the depicted implementation the first fuel line connection 505 and the second fuel line connection 510 are each configured with a pressure/flow sensor 584. In the depicted implementation each of the gas accumulation lines 530 are configured with a plurality of gas ventilation tubes 590 in the cation pod 520 and anion pod 525 of each electrolysis pod 515. In the depicted implementation each gas accumulation line 530 is configured with a control valve 586. In the depicted implementation each pressure/flow sensor 584 and each control valve 586 is operably coupled with the control system 103 (depicted at least by FIG. 1). The control system 103 may receive sensor data from each pressure/flow sensor 584. The control system 103 may independently operate each control valve 586 to selectively connect and disconnect each row 535 of electrolysis pods 515 from the thermal reaction chamber 154. The control system 103 may selectively connect and disconnect various numbers of the rows 535 of electrolysis pods 515 at different times to configure the electrolysis chamber 106 to generate hydrogen in an amount or at a rate determined by the control system 103 to satisfy a demand. In the depicted implementation the electrolysis chamber 106 comprises a plurality of pod dividers (shown in FIG. 5 by dashed vertical lines that correspond to the individual pod dividers 635 shown in at least FIG. 6). The depicted pod dividers are configured between each cation pod 520 and anion pod 525. In the illustrated example each row 535 of the plurality of electrolysis pods 515 is separated by a pod division wall.

Figure 6:
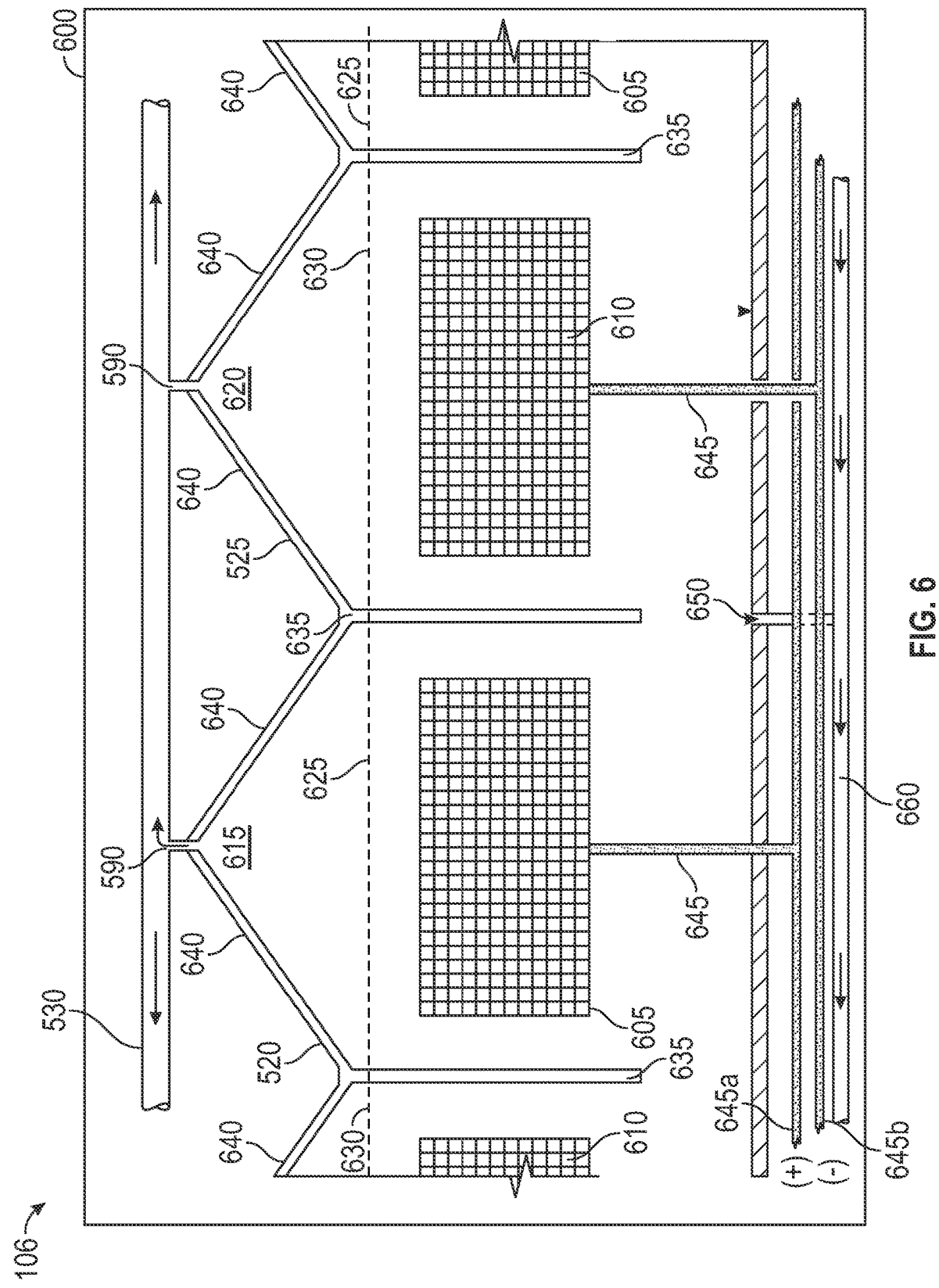
FIG. 6 depicts a cross-sectional view of an exemplary electrolysis pool/electrolysis chamber.

FIG. 6 depicts a cross-sectional view of an exemplary electrolysis pool/electrolysis chamber. In FIG. 6, the cross-sectional view 600 depicts the exemplary electrolysis chamber 106. In the depicted implementation, the electrolysis chamber 106 comprises the cation pod 520 and the anion pod 525. Together, the cation pod 520 and the anion pod 525 comprise one electrolysis pod 515 of a plurality of electrolysis pods 515 (depicted at least by FIG. 5). In the depicted implementation, each cation pod 520 is configured with a cation electrolysis mesh 605. The cation electrolysis mesh 605 may be a copper mesh. In the depicted implementation each anion pod 525 is configured with an anion electrolysis mesh 610. The anion electrolysis mesh 610 may be a copper mesh. In the depicted implementation the cation pod 520 is in fluid communication with the gas accumulation line 530 through the gas ventilation tube 590 fluidly connecting the cation pod gas accumulation area 615 with the gas accumulation line 530. In the depicted implementation the anion pod 525 is in fluid communication with the gas accumulation line 530 through a gas ventilation tube 590 fluidly connecting the anion pod gas accumulation area 620 with the gas accumulation line 530. In the depicted implementation the plurality of electrolysis pods 515 may retain water. The electrolysis chamber 106 dissociates hydrogen and oxygen from the water. In the depicted implementation the cation pod 520 retains water up to the cation pod water line 625. In the depicted implementation the anion pod 525 retains water up to the anion pod water line 630. In the depicted implementation the plurality of electrolysis pods 515 comprise pod dividers 635 separating each cation pod 520 and anion pod 525 from each other. In the depicted implementation each cation pod 520 and anion pod 525 has a gas containment cap 640 permitting the dissociated gases to accumulate in the respective cation pod gas accumulation area 615 and anion pod gas accumulation area 620. In the depicted implementation the respective cation electrolysis mesh 605 and anion electrolysis mesh 610 are supplied with electrical power for electrolysis by the power distribution cables 645. The depicted power distribution cables 645 are configured with the positive electrical connection 645a and the negative power electrical connection 645b. Although a direct current electrical distribution network is shown, the electrical distribution network may be configured for any type of electrical power distribution. In the depicted implementation the electrolysis chamber 106 includes the backflow preventer valve 650 configured with the $H_2O$ refill access port 655. In the depicted implementation the $H_2O$ refill access port 655 is in fluid communication with the $H_2O$ refill supply line 660. The $H_2O$ refill supply line 660 may be connected in fluid communication with one or more ancillary systems to receive recycled water or make-up water, for replenishing water available for hydrogen generation by electrolysis in the electrolysis chamber 106.

Figure 7:
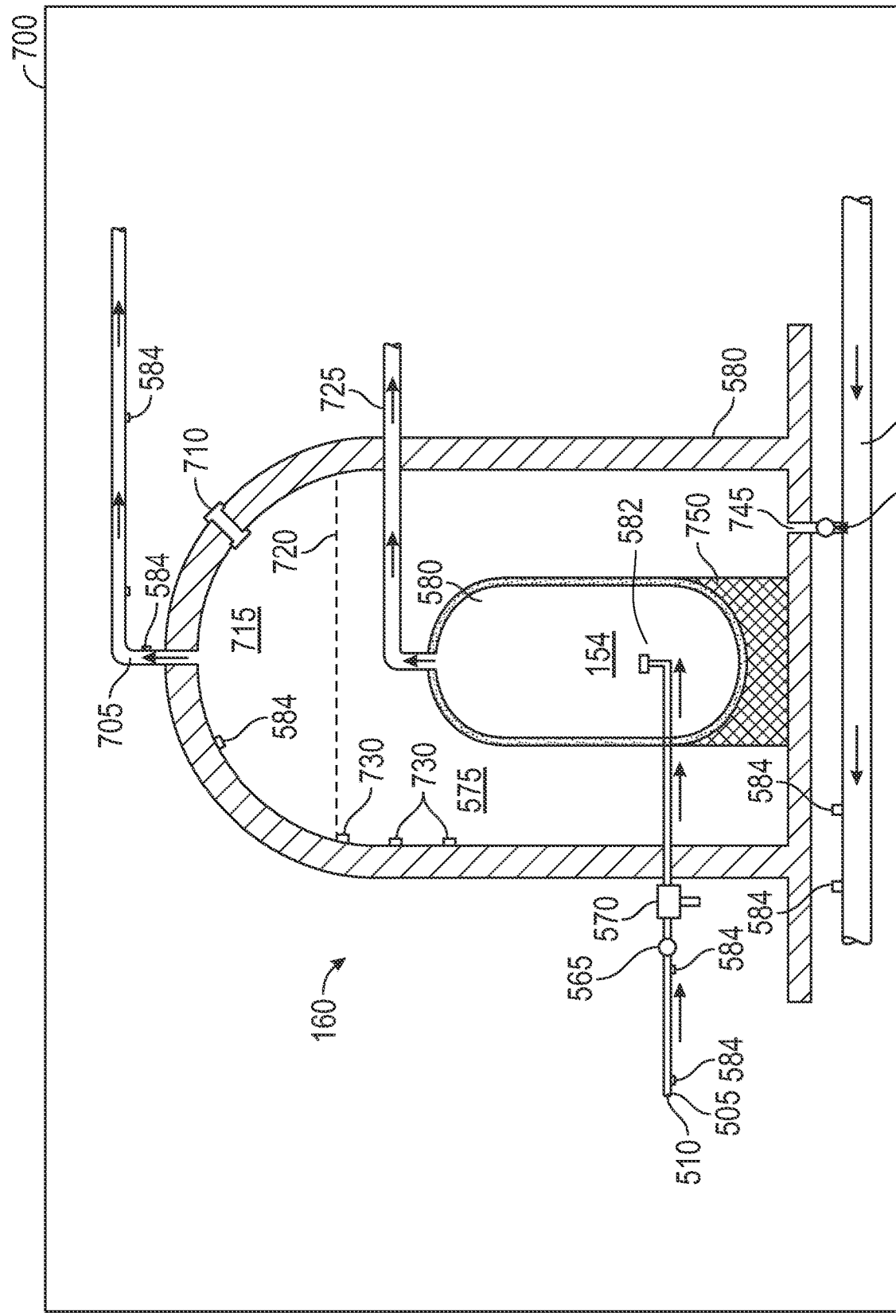
FIG. 7 depicts an elevation cross-sectional view of an exemplary thermal reaction chamber and containment vessel.

FIG. 7 depicts an elevation cross-sectional view of an exemplary thermal reaction chamber and containment vessel. In FIG. 7, the elevation cross-sectional view 700 depicts the containment vessel 160 retaining the thermal reaction chamber 154. In some implementations the thermal reaction chamber 154 may be separated from the containment vessel 160. The depicted containment vessel 160 comprises the primary pressurized steam line 705 in fluid communication with the containment vessel 160 interior. In the depicted implementation one or more pressure/flow sensor 584 is configured in the primary pressurized steam line 705. The depicted containment vessel 160 is also configured with the emergency pressure relief valve 710. In the depicted implementation the containment vessel 160 may retain water and steam. The steam retained by the containment vessel 160 may be retained in the steam pressurized area 715 above the containment vessel 160 water line 720. In the depicted implementation the thermal reaction chamber 154 is in fluid communication with the post-reaction vent 725. The post-reaction vent 725 may be connected to a condensing system. In the depicted implementation the water level in the containment vessel 160 may be monitored by the control system 103 (depicted at least by FIG. 1) using the fill sensors 730. In the depicted implementation the containment vessel 160 may be supplied with water through the main $H_2O$ replenishment line 735 and the high-pressure $H_2O$ pump valve 740. The main $H_2O$ replenishment line 735 may be connected to a water supply such as a condenser pool to reuse water condensed from generated steam. The high-pressure $H_2O$ pump valve 740 may be configured in fluid communication with a backflow prevent valve 745. In the depicted implementation the thermal reaction chamber 154 is mechanically secured by the reaction chamber seating 750 within the containment vessel 160.

Figure 8:
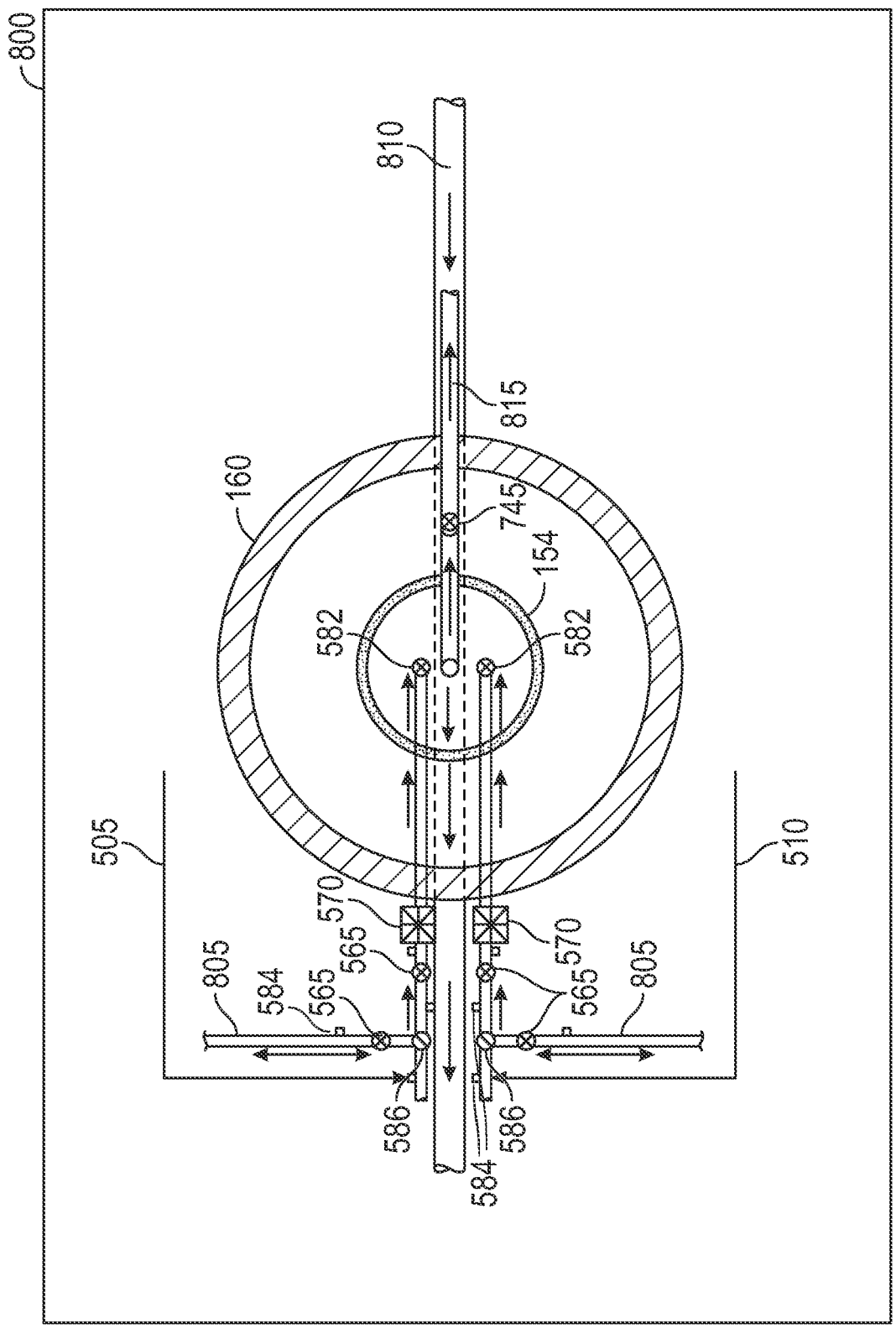
FIG. 8 depicts a top cross-sectional view of an exemplary thermal reaction chamber and containment vessel.

FIG. 8 depicts a top cross-sectional view of an exemplary thermal reaction chamber and containment vessel. In FIG. 8, the top cross-sectional view depicts the containment vessel 160 retaining the thermal reaction chamber 154. In the depicted implementation the $O_2H_2$ reserve gas lines 805 are in fluid communication to/from a reserve storage tank (not shown). In the depicted example the mail $H_2O$ replenishment line 810 is configured in fluid communication with a condenser pool (not shown) to receive water condensed from steam. In the depicted implementation the post-reaction vent 815 is fluidly couples the thermal reaction chamber 154 with a condenser system (not shown).

Figure 9:
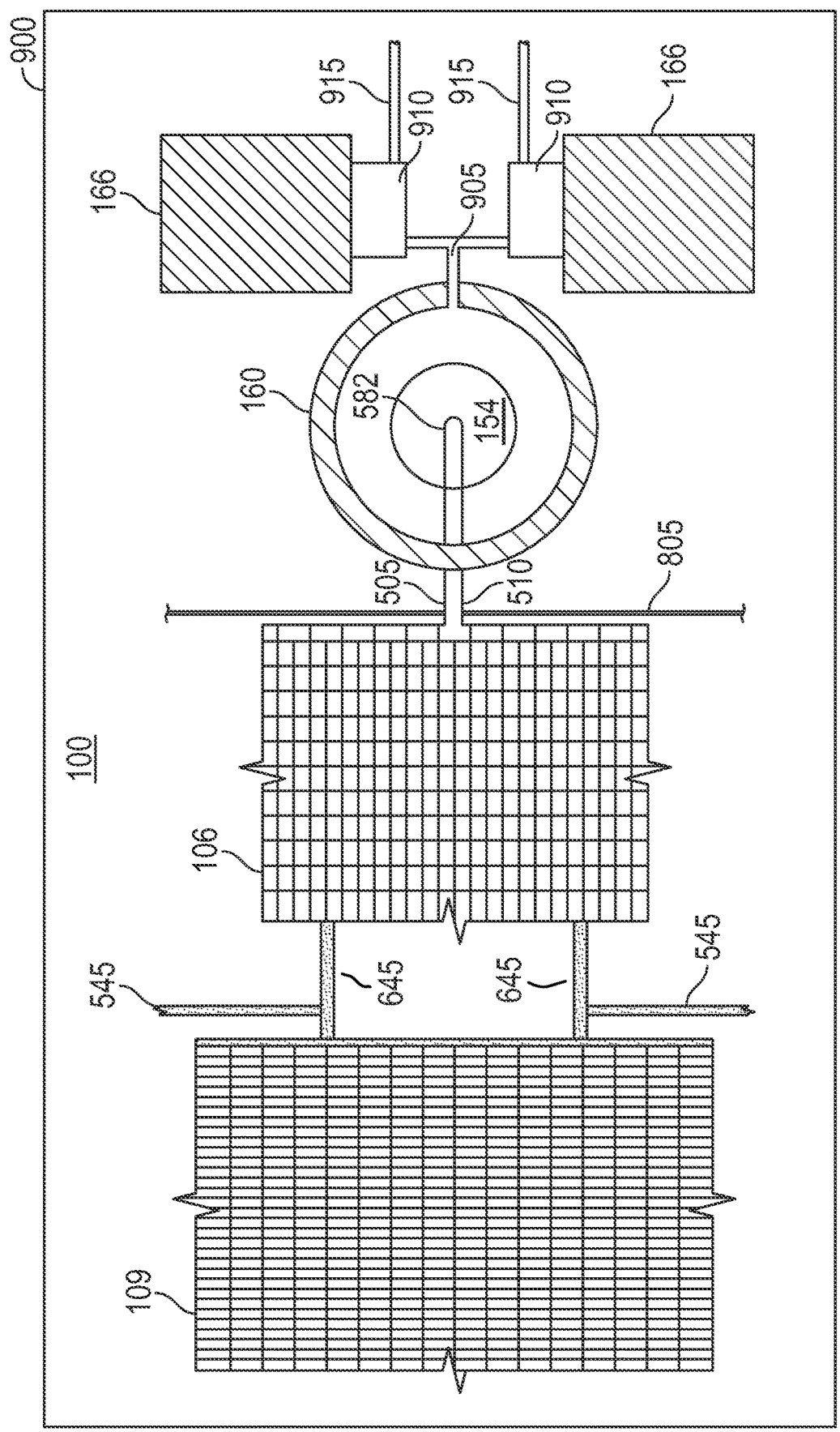
FIG. 9 depicts a plan view of an exemplary HEF-TEG system.

FIG. 9 depicts a plan view of an exemplary HEF-TEG system. In FIG. 9, the plan view 900 depicts the exemplary HEF-TEG electric power generation system 100 comprising the high-pressure steam line 905 connecting the containment vessel 160 to the pair of steam-powered electric generators 166. In the depicted implementation the pair of steam-powered electric generators 166 are configured with turbines 910 adapted to use high-pressure steam received from the containment vessel 160 to generate electricity. In the depicted implementation the steam-powered electric generators 166 are configured with low-pressure steam lines 915 that may be connected to a condensing system (not shown). The condensing system may recover water from low-pressure steam after the high-pressure steam drives the steam-powered electric generator 166. The recovered water may be recycled to the electrolysis chamber 106 for reuse comprising performing electrolysis on the recovered water. The depicted implementation includes the photovoltaic array 109 electrically connected to the electrolysis chamber 106 to power electrolysis to generate hydrogen. In the depicted implementation hydrogen and oxygen dissociated from water by the electrolysis chamber 106 are supplied to the thermal reaction chamber 154 by the first fuel line connection 505 and the second fuel line connection 510.

Although various features have been described with reference to the Figures, other features are possible. For example, the photovoltaic array may be made using monocrystalline type photovoltaic panels for efficiency and use during overcast weather.

An exemplary HEF-TEG implementation may achieve one or more advantageous technical effects. For example, an HEF-TEG implementation may produce true clean energy. An HEF-TEG implementation may use no natural resources in the process of producing energy. An HEF-TEG implementation may produce no environmentally negative byproduct. An HEF-TEG implementation may be scalable and rapidly deployable.

The electrolyzer may be powered by renewable energy sources such as solar or wind power, thereby ensuring a sustainable and environmentally friendly process of hydrogen generation. To illustrate, consider a scenario where a request for a specific amount of electric energy is received. The electrolyzer is then activated to start the dissociation process, producing hydrogen gas which is collected and stored in a suitable storage system, such as a hydrogen tank or a metal hydride storage unit.

In an alternative embodiment, the method may involve utilizing a water-splitting catalyst to facilitate the dissociation of hydrogen from water molecules. The catalyst can enhance the efficiency of the dissociation process, leading to a more rapid generation of hydrogen for storage. For instance, imagine a situation where the water-splitting catalyst is integrated into the electrolyzer system. As water flows through the electrolyzer, the catalyst promotes the separation of hydrogen from oxygen, allowing for a continuous and efficient production of hydrogen gas.

Furthermore, in another implementation, the method may include monitoring the level of stored hydrogen using sensors or gauges. These monitoring devices can provide real-time data on the amount of hydrogen available for recombination with oxygen to generate electric energy. For example, sensors placed within the hydrogen storage system can measure the pressure or volume of stored hydrogen. When the sensors indicate that a sufficient amount of hydrogen has accumulated, the system can automatically initiate the recombination process to meet the requested energy demand.

The system may comprise a heat exchanger configured to efficiently transfer heat from the water surrounding the third container to the water within the fourth container. This transfer of heat helps in maintaining a consistent temperature within the system, thereby optimizing the efficiency of steam generation. For example, the heat exchanger may consist of a series of heat transfer coils made of a high thermal conductivity material such as copper or aluminum. These coils are strategically positioned to facilitate the transfer of thermal energy from the water surrounding the third container to the water in the fourth container. As a result, the heat exchanger ensures that the thermal energy surplus is effectively utilized for steam generation.

Alternatively, the power generation system can be modified to include a condenser unit connected to the steam turbine. The condenser unit is designed to rapidly cool and condense the steam exiting the steam turbine back into water. This condensed water can then be recirculated back to the fourth container, thus creating a closed-loop system that minimizes water consumption and maximizes efficiency.

Moreover, the power generation system may be equipped with a control system that monitors various parameters such as temperature, pressure, and electricity output. The control system can adjust the operation of the electrolysis process, combustion reaction, and steam generation based on real-time data to ensure optimal performance and safety of the system.

Furthermore, the power generation system can be scaled up by increasing the number of photovoltaic cells, containers, and steam turbines in a modular fashion. This scalability allows the system to be customized according to the power requirements of different users, whether it be for residential, commercial, or industrial applications.

An alternative approach to the electrolysis process could involve utilizing a membrane electrolyzer. In this setup, a proton exchange membrane separates the anode and cathode compartments, allowing only protons to pass through while blocking the gases. This can enhance the efficiency of the electrolysis process by preventing gas crossover and improving the purity of the hydrogen and oxygen produced.

Furthermore, the electrolysis process could be integrated with a gas purification system to remove impurities and moisture from the hydrogen and oxygen gases. This purification step ensures that the gases fed into the combustion process are of high quality, leading to more efficient combustion and energy generation.

Once water is collected, the water can be directed to a water purification system within the power generation system. The water purification system may consist of filters, membranes, or other purification technologies to remove impurities and contaminants from the water. This purified water can then be stored in a separate reservoir within the power generation system for reuse in the electrolysis process or other system functions. By implementing a water collection and recycling system, the power generation system can achieve a closed-loop water cycle, minimizing water wastage and promoting sustainability. Additionally, the purified water can help maintain the efficiency and longevity of the electrolysis components by reducing the build-up of impurities within the system. Furthermore, the water collection and recycling system can be equipped with sensors and control mechanisms to monitor water levels, quality, and flow rates. These sensors can provide real-time data to the system's control unit, allowing for automatic adjustments and optimizations to ensure optimal water usage and system performance.

The monitoring and control unit may be configured to regulate the electrolysis process based on the electricity output of the photovoltaic cells. For example, when the electricity output is high, the monitoring and control unit can increase the rate of electrolysis to maximize hydrogen production. Conversely, when the electricity output is low, the monitoring and control unit can reduce the electrolysis rate to conserve energy.

Moreover, the power generation system can be designed with modular components that allow for scalability. Additional photovoltaic cell sets, containers for electrolysis and combustion, and steam turbines can be easily added to the system to increase power generation capacity as needed. This modular design enables the power generation system to adapt to varying energy demands and expand its electricity production capabilities without requiring a complete overhaul of the existing infrastructure.

By managing the fluid connection state between the second and third containers, the control system ensures a seamless flow of gases for the electrolysis process. For example, in a scenario where the sensor data indicates that the hydrogen and oxygen levels are below the threshold required for electricity generation, the control system can trigger the electrolysis process to produce more gases. This dynamic adjustment ensures a continuous supply of gases for power generation, optimizing the system's efficiency. Furthermore, the control system can be programmed to prioritize the utilization of gases based on specific requirements. For instance, during periods of high electricity demand, the control system can regulate the flow of gases to maximize power output. Conversely, during low-demand periods, the system can adjust the gas production to conserve energy and resources. Additionally, the control system can incorporate predictive algorithms to anticipate fluctuations in electricity demand or variations in gas production. By proactively adjusting the fluid connection state between containers, the control system can preemptively optimize the power generation process, ensuring a stable and consistent power supply. In an alternative embodiment, the control system may also include remote monitoring capabilities, allowing operators to oversee the system's performance from a centralized location. This feature enables real-time adjustments and troubleshooting, enhancing the system's operational flexibility and responsiveness to changing conditions. The power generation system, as described above, is configured in such a way that when the control system determines that there are quantities of hydrogen and oxygen that are sufficient to generate electricity, the control system is further configured to establish a fluid connection between the second container and the third container. This fluid connection allows for the reception of the hydrogen and oxygen components from the second container into the third container.

Sensors may provide real-time data to the control system, enabling it to accurately determine when the quantities of hydrogen and oxygen are at optimal levels for electricity generation.

The third container may be equipped with electrodes that are immersed in the hydrogen and oxygen mixture. These electrodes can facilitate the electrochemical reactions necessary for electricity generation. The electrodes may be made of materials such as platinum, graphite, or other conductive materials suitable for catalyzing the reactions between hydrogen and oxygen. As an alternative configuration, the power generation system could include a fourth container that stores an electrolyte solution. The control system could be further configured to establish a fluid connection between the third container and the fourth container when electricity generation is initiated. This fluid connection would allow the electrolyte solution to flow into the third container, where it can interact with the hydrogen and oxygen mixture to enhance the electrochemical reactions and improve the efficiency of power generation.

The power generation system could be designed to operate in a closed-loop system, where any excess water produced as a byproduct of the electrochemical reactions is collected and recycled back into the system. This closed-loop system can help conserve water and ensure the sustainability of the power generation process. In another embodiment, the control system could be programmed to adjust the flow rate of hydrogen and oxygen into the third container based on the electricity demand. By dynamically controlling the flow rate, the system can optimize electricity generation efficiency and respond to fluctuations in power requirements.

Sensors may detect when the quantities of hydrogen and oxygen are below a certain threshold required for efficient electricity generation. Once this threshold is reached, the control system initiates the disconnection of the second container from the third container. An example of how this may work is as follows: Let's say the power generation system is producing hydrogen and oxygen through electrolysis. The sensors in the control system continuously monitor the gas levels in the containers. If the sensors detect that the production rate has decreased and is no longer sufficient for generating electricity, the control system will activate valves or switches to disconnect the second container from the third container. This prevents the system from receiving inadequate amounts of hydrogen and oxygen, ensuring that only optimal levels are used for power generation. Alternatively, the control system could be programmed to analyze the rate of hydrogen and oxygen production over time. If it detects a consistent downward trend in production levels that would lead to insufficient quantities for electricity generation, it can proactively disconnect the containers before the threshold is reached. This predictive maintenance approach can help optimize the system's performance and prevent interruptions in power generation.

The control system could be designed to send alerts or notifications to a user or a central monitoring system when the disconnection occurs. This real-time feedback can help operators take necessary actions, such as refilling the water or adjusting the system settings, to ensure continuous and efficient power generation.

Additionally, the power generation system may include safety features to prevent any accidental recombination of hydrogen and oxygen. For example, the system can incorporate fail-safe mechanisms that require multiple levels of authorization before activating the recombination process. This can help prevent any unauthorized or premature activation of the system, ensuring safe and controlled energy generation.

Furthermore, the power generation system may be designed to optimize the efficiency of hydrogen generation and recombination. This can involve algorithms that calculate the most efficient times to dissociate hydrogen from water based on energy demand patterns. By intelligently managing the generation and storage of hydrogen, the system can ensure a continuous and reliable energy supply.

Moreover, the power generation system may be scalable to accommodate varying energy demands. For instance, multiple units of the power generation system can be interconnected to form a larger network. This networked system can distribute the workload of hydrogen generation and energy production, allowing for flexibility in meeting different energy requirements.

Alternative embodiments of the power generation system may utilize different methods for hydrogen generation, such as electrolysis or steam methane reforming. These alternative methods can offer distinct advantages in terms of efficiency, cost-effectiveness, or environmental impact. By exploring various hydrogen generation techniques, the power generation system can be tailored to specific needs and preferences.

While multiple electric power generation implementations are disclosed, still other implementations will become apparent to those skilled in the art from this detailed description. Disclosed implementations may be capable of myriad modifications in various obvious aspects, all without departing from the spirit and scope of the disclosed implementations. Accordingly, the drawings and descriptions are to be regarded as illustrative in nature and not restrictive.

It should be noted that the features illustrated in the drawings are not necessarily drawn to scale, and features of one implementation may be employed with other implementations as the skilled artisan would recognize, even if not explicitly stated herein. Descriptions of well-known components and processing techniques may be omitted so as to not unnecessarily obscure the implementation features.

In the present disclosure, various features may be described as being optional, for example, through the use of the verb "may;" or, through the use of any of the phrases: "in some implementations," "in some designs," "in various implementations," "in various designs," "in an illustrative example," or, "for example." For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be implemented in seven different ways, namely with just one of the three possible features, with any two of the three possible features or with all three of the three possible features.

In various implementations, elements described herein as coupled or connected may have an effectual relationship realizable by a direct connection or indirectly with one or more other intervening elements.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various implementations have been disclosed and described in detail herein, it will be apparent to those skilled in the art that various changes may be made to the disclosed configuration, operation, and form without departing from the spirit and scope thereof. In particular, it is noted that the respective implementation features, even those disclosed solely in combination with other implementation features, may be combined in any configuration excepting those readily apparent to the person skilled in the art as nonsensical. Likewise, use of the singular and plural is solely for the sake of illustration and is not to be interpreted as limiting.

The Abstract is provided to comply with 37 C. F. R. § 1.72 (b), to allow the reader to quickly ascertain the nature of the technical disclosure and is submitted with the understanding that it will not be used to interpret or limit the scope or meaning of the claims.

In the present disclosure, all descriptions where "comprising" is used may have as alternatives "consisting essentially of," or "consisting of." In the present disclosure, any method or apparatus implementation may be devoid of one or more process steps or components. In the present disclosure, implementations employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an implementation "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Many suitable methods and corresponding materials to make each of the individual parts of implementation apparatus are known in the art. One or more implementation part may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as may be described hereinabove may be used. Many suitable materials are known and available and can be selected and mixed depending on desired strength and flexibility, preferred manufacturing method and particular use, as will be apparent to a person of ordinary skill in the art.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f). Elements recited in means-plus-function format are intended to be construed in accordance with 35 U.S.C. § 112 (f).

Recitation in a claim of the term "first" with respect to a feature or element does not necessarily imply the existence of a second or additional such feature or element.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The terms "abutting" or "in mechanical union" refer to items that are in direct physical contact with each other, although the items may not necessarily be attached together.

The word "exemplary" is used herein to mean "serving as an example, instance, or illustration." Any implementation described herein as "exemplary" is not necessarily to be construed as preferred over other implementations. While various aspects of the disclosure are presented with reference to drawings, the drawings are not necessarily drawn to scale unless specifically indicated.

Reference throughout this specification to "an implementation" or "the implementation" means that a particular feature, structure, or characteristic described in connection with that implementation is included in at least one implementation. Thus, the quoted phrases, or variations thereof, as recited throughout this specification are not necessarily all referring to the same implementation.

Similarly, it should be appreciated that in the above description, various features are sometimes grouped together in a single implementation, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects may lie in a combination of fewer than all features of any single foregoing disclosed implementation. Thus, the claims following this Detailed Description are hereby expressly incorporated into this Detailed Description, with each claim standing on its own as a separate implementation. This disclosure is intended to be interpreted as including all permutations of the independent claims with their dependent claims.

A system or method implementation in accordance with the present disclosure may be accomplished through the use of one or more computing devices. As depicted, for example, at least in FIG. 1 and FIG. 2, one of ordinary skill in the art would appreciate that an exemplary system appropriate for use with implementation in accordance with the present application may generally include one or more of a Central processing Unit (CPU), Random Access Memory (RAM), a storage medium (e.g., hard disk drive, solid state drive, flash memory, cloud storage), an operating system (OS), one or more application software, a display element, one or more communications means, or one or more input/output devices/means. Examples of computing devices usable with implementations of the present disclosure include, but are not limited to, proprietary computing devices, personal computers, mobile computing devices, tablet PCs, mini-PCs, servers, or any combination thereof. The term computing device may also describe two or more computing devices communicatively linked in a manner as to distribute and share one or more resources, such as clustered computing devices and server banks/farms. One of ordinary skill in the art would understand that any number of computing devices could be used, and implementation of the present disclosure are contemplated for use with any computing device.

In various implementations, communications means, data store(s), processor(s), or memory may interact with other components on the computing device, in order to effect the provisioning and display of various functionalities associated with the system and method detailed herein. One of ordinary skill in the art would appreciate that there are numerous configurations that could be utilized with implementations of the present disclosure, and implementations of the present disclosure are contemplated for use with any appropriate configuration.

In the present disclosure "electronic message" should be understood to mean any form of electronic communication including but not limited to data packets, interrupts, button presses, function calls, error messages, visual indications, and the like.

In the present disclosure "digital indication" should be understood as synonymous and interchangeable with "electronic message."

As used herein, a singular term may include multiple objects. As used herein, a single element may include multiple such elements. For example, the term "computer" may include a single computer or multiple computers. The phrase "a computer that stores data and runs software," may include a single computer that both stores data and runs software, a first computer that stores data and a second computer that runs software, or multiple computers that together store data and run software, where at least one of the multiple computers stores data and at least one of the multiple computers runs software. For example, the term "processor" may include a single processor or multiple processors. The phrase "a processor that stores data and runs software," may include a single processor that both stores data and runs software, a first processor that stores data and a second processor that runs software, or multiple processors that together store data and run software, where at least one of the multiple processors stores data and at least one of the multiple processors runs software. An implementation comprising multiple processors may configure each particular processor of the multiple processors to exclusively execute only a particular task assigned to that particular processor. An implementation comprising multiple processors may configure each particular processor of the multiple processors to execute any task of multiple tasks assigned to that particular processor by a scheduler such that a different task may be assigned to different processors at different times. As used herein in an apparatus or a computer-readable medium, "at least one" object rather than or in addition to a single object may perform the claimed operations. For example, "a computer-readable medium" may be construed as "at least one computer-readable medium," and "an apparatus comprising a processor and a memory" may be construed as "a system comprising processing circuitry and a memory subsystem," or "a system comprising processing circuitry and memory" (where memory lacks the article 'a'). It should be noted that a skilled person would understand that "processing circuitry" may include a single processor or multiple processors. Similarly "memory subsystem" or "memory" (lacking an article) may include a single memory unit or multiple memory unit.

According to an implementation of the present disclosure, the communications means of the system may be, for instance, any means for communicating data over one or more networks or to one or more peripheral devices attached to the system. Appropriate communications means may include, but are not limited to, circuitry and control systems for providing wireless connections, wired connections, cellular connections, data port connections, Bluetooth® connections, or any combination thereof. One of ordinary skill in the art would appreciate that there are numerous communications means that may be utilized with implementations of the present disclosure, and implementations of the present disclosure are contemplated for use with any communications means.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on-any and all of which may be generally referred to herein as a "circuit," "module," or "system."

While the foregoing drawings and description may set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an implementation may include an alternate order of the steps adapted to a particular application of a technique disclosed herein. All such variations and modifications are intended to fall within the scope of this disclosure. The depiction and description of steps in any particular order is not intended to exclude implementations having the steps in a different order, unless required by a particular application, explicitly stated, or otherwise clear from the context.

Traditionally, a computer program consists of a sequence of computational instructions or program instructions. It will be appreciated that a programmable apparatus (that is, computing device) can receive such a computer program and, by processing the computational instructions thereof, produce a further technical effect.

A programmable apparatus may include one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable, and replaceable, or fixed. It will also be understood that a computer can include a Basic Input/Output System (BIOS), firmware, an operating system, a database, or the like that can include, interface with, or support the software and hardware described herein.

Implementations of the system as described herein are not limited to applications involving conventional computer programs or programmable apparatuses that run them. It is contemplated, for example, that implementations of the disclosure as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code encoded therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code encoded by a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

Unless explicitly stated or otherwise clear from the context, the verbs "execute" and "process" are used interchangeably to indicate execute, process, interpret, compile, assemble, link, load, any and all combinations of the foregoing, or the like. Therefore, implementations that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, implementations of the disclosure are not described with reference to any particular programming language. It is appreciated that a variety of programming languages may be used to implement the present teachings as described herein, and any references to specific languages are provided for disclosure of enablement and best mode of implementations of the disclosure. Implementations of the disclosure are well suited to a wide variety of computer network systems over numerous topologies. Within this field, the configuration and management of large networks include storage devices and computers that are communicatively coupled to dissimilar computers and storage devices over a network, such as the Internet.

A number of implementations have been described. Nevertheless, it will be understood that various modifications may be made. For example, the steps of the disclosed techniques may be performed in a different sequence, components of the disclosed systems may be combined in a different manner, or the components may be supplemented with other components. Accordingly, other implementations are contemplated, within the scope of the following claims.

What is claimed is:

1. A method for generating power comprising:
   receiving an electronic request for an amount of electric energy using a processor;
   determining if sufficient hydrogen to generate the requested amount of electric energy is available within a power generation system;
   in response to determining sufficient hydrogen is available, activating a thermal reaction chamber to generate the requested amount of electric energy; and
   in response to determining insufficient hydrogen to generate the requested amount of electric energy is available:
      refraining from activating the thermal reaction chamber until sufficient hydrogen has been generated; and
      dissociating hydrogen from water using an electrolyzer until sufficient hydrogen is available to activate the thermal reaction chamber to generate the requested amount of electric energy.

2. The method of claim 1, wherein the method further comprises storing the dissociated hydrogen.

3. The method of claim 1, wherein the method further comprises determining an amount of hydrogen available as a function of sensor data, using the processor.

4. The method of claim 3, wherein the sensor data further comprises a flow rate measurement of hydrogen from the electrolyzer.

5. The method of claim 3, wherein the sensor data further comprises a pressure measurement within a storage vessel.

6. The method of claim 3, wherein the method further comprises determining whether to generate hydrogen or generate electricity, depending on an amount of hydrogen available and the requested amount of electric energy.

7. The method of claim 1, wherein the method further comprises determining if sufficient pressure has developed in a containment vessel operably coupled with the thermal reaction chamber to produce enough steam to generate the requested amount of electric energy, determined by the processor as a function of sensor data.

8. The method of claim 7, wherein the method further comprises in response to determining sufficient pressure has developed in the containment vessel to produce enough steam to generate the requested amount of electric energy, sending one or more control signals operating one or more valves to release steam from the containment vessel to a steam turbine, using the processor and a control system.

9. The method of claim 8, wherein the method further comprises measuring electric energy generated by the steam turbine as a function of sensor data, using the processor and the control system.

10. The method of claim 9, wherein the method further comprises determining if the requested amount of electric energy has been generated based on the measured electric energy, using the processor.

11. The method of claim 10, wherein the method further comprises in response to determining the requested amount of electric energy has been generated, sending one or more control signals governing valves or fluid connections, to stop recombining hydrogen and oxygen in the thermal reaction chamber, using the processor and the control system.

12. A power generation system comprising:
    a first container comprising photovoltaic cells;
    a second container comprising an electrolyzer electrically connected to the photovoltaic cells;
    a third container retained within a fourth container, wherein the third container is in fluid communication with the second container and the fourth container, wherein the third container is configured to combust hydrogen received from the second container, and wherein the fourth container is configured to contain a thermal energy surplus and water surrounding the third container,
    wherein the fourth container is configured to receive the thermal energy surplus from the third container to generate pressurized steam in the fourth container; and
    a steam turbine generator configured to receive the pressurized steam from the fourth container to generate power.

13. The power generation system of claim 12, wherein the water produced by the combustion of the hydrogen is condensed in an ancillary system.

14. The power generation system of claim 13, wherein the water condensed in the ancillary system is recycled to the second container for reuse comprising electrolysis on the recycled water.

15. The power generation system of claim 12, wherein the water produced by the combustion of the hydrogen is vented into an atmosphere.

16. The power generation system of claim 12, wherein the generated electricity is supplied to a public power grid.

17. The power generation system of claim 12, wherein the power generation system further comprises a control system governing a fluid connection state between the second container and the third container, wherein the control system is configured to determine, based on sensor data, whether a hydrogen quantity sufficient to generate electricity has been produced by electrolysis in the second container.

18. The power generation system of claim 17, wherein upon determining hydrogen sufficient to generate electricity has been produced, the control system is configured to fluidly connect the second container to the third container to receive the hydrogen from the second container.

19. The power generation system of claim 17, wherein upon determining hydrogen sufficient to generate electricity has not been produced, the control system is configured to fluidly disconnect the second container from the third container to refrain from receiving the hydrogen from the second container.

20. An article of manufacture comprising a non-transitory computer readable storage medium retrievably storing processor executable instructions configured to cause a power generation system to perform operations comprising:
- receive an electronic request for an amount of electric energy using a processor;
- determine if sufficient hydrogen to generate the requested amount of electric energy is available within a power generation system;
- in response to determining sufficient hydrogen is available, activating a thermal reaction chamber to generate the requested amount of electric energy; and
- in response to determining insufficient hydrogen to generate the requested amount of electric energy is available:
  - refrain from activating the thermal reaction chamber until sufficient hydrogen has been generated; and
  - dissociate hydrogen from water using an electrolyzer until sufficient hydrogen is available to activate the thermal reaction chamber to generate the requested amount of electric energy.

* * * * *